P. ROBLE.
TYPEWRITING MACHINE.
APPLICATION FILED MAR. 4, 1915. RENEWED OCT. 18, 1919.

1,339,369.

Patented May 4, 1920.
17 SHEETS—SHEET 1.

WITNESSES

INVENTOR
Pedro Roble
BY
ATTORNEYS

P. ROBLE.
TYPEWRITING MACHINE.
APPLICATION FILED MAR. 4, 1915. RENEWED OCT. 18, 1919.
1,339,369.
Patented May 4, 1920.
17 SHEETS—SHEET 2.
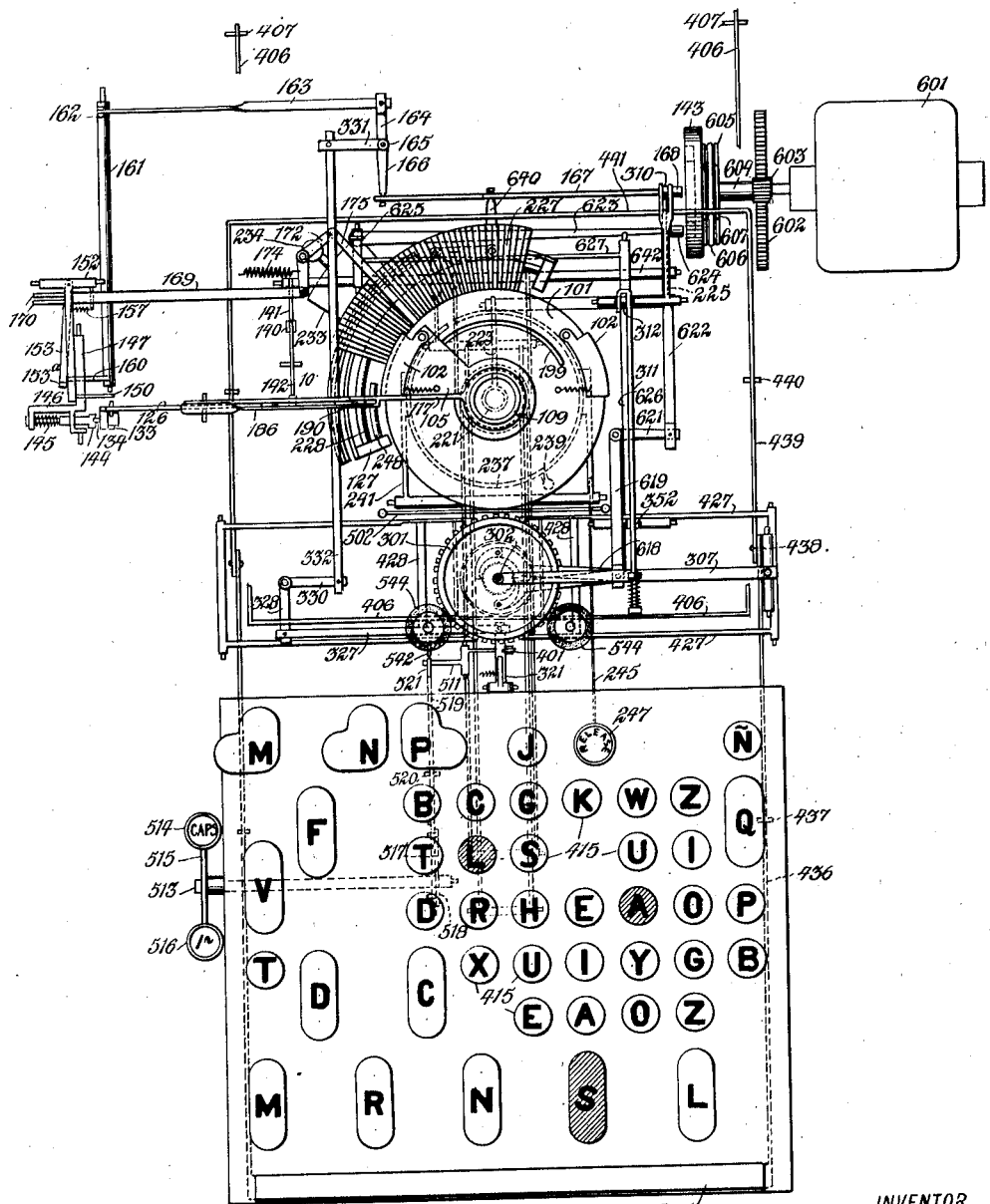
WITNESSES
INVENTOR
Pedro Roble
BY
ATTORNEYS

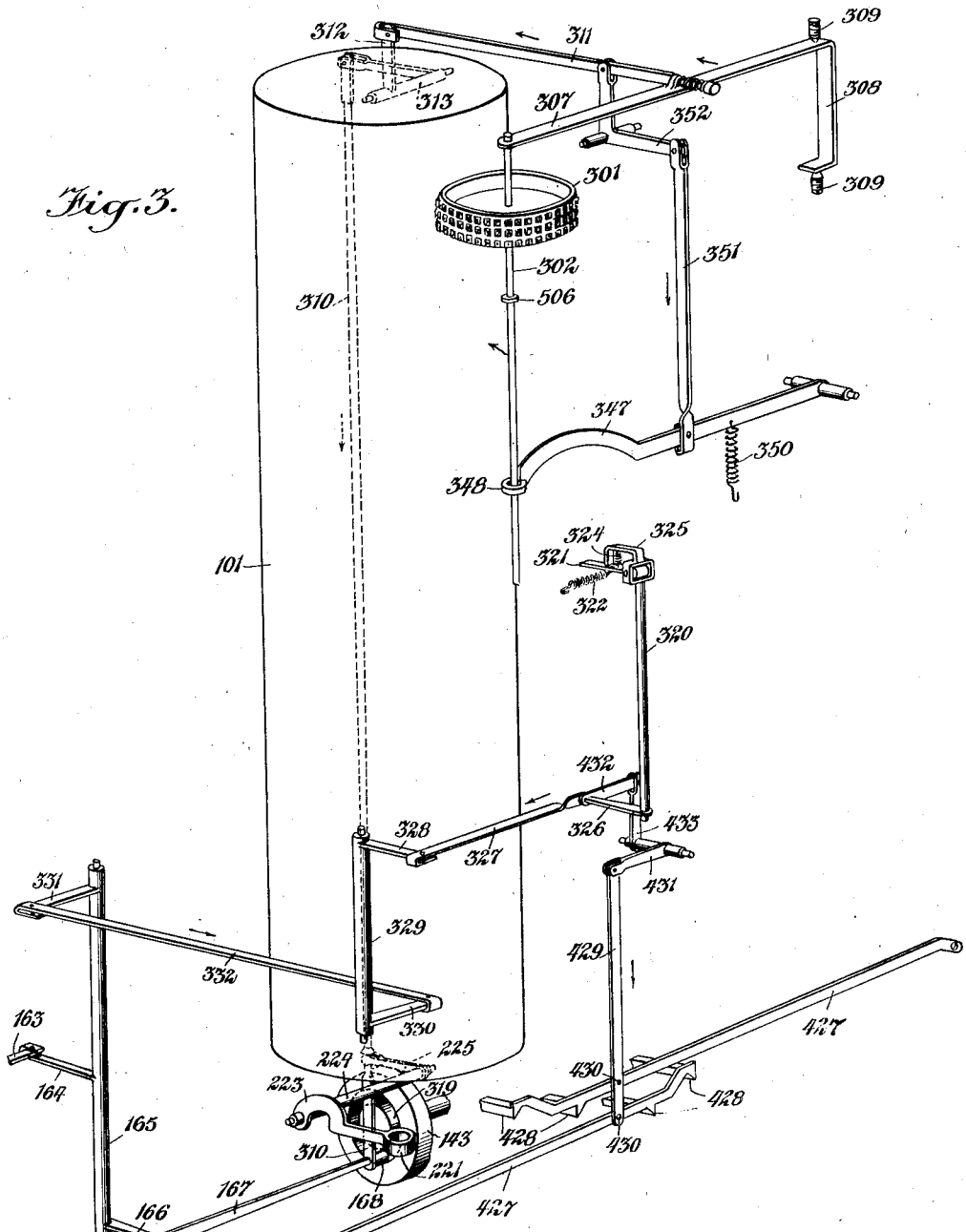

P. ROBLE.
TYPEWRITING MACHINE.
APPLICATION FILED MAR. 4, 1915. RENEWED OCT. 18, 1919.
1,339,369.
Patented May 4, 1920.
17 SHEETS—SHEET 4.
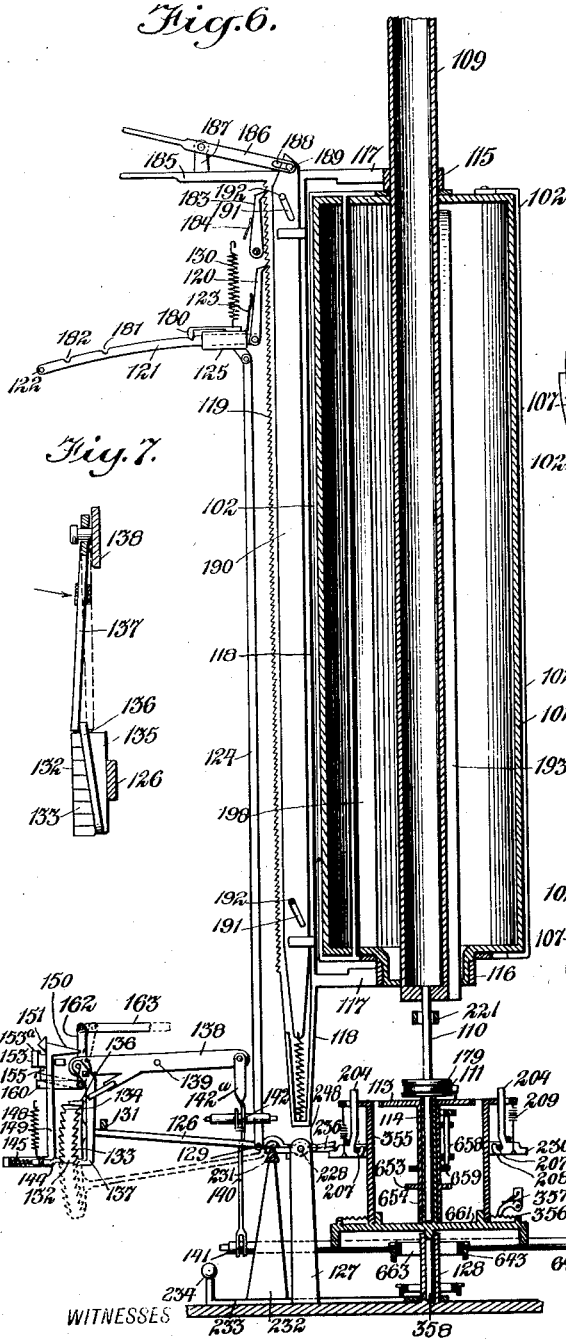
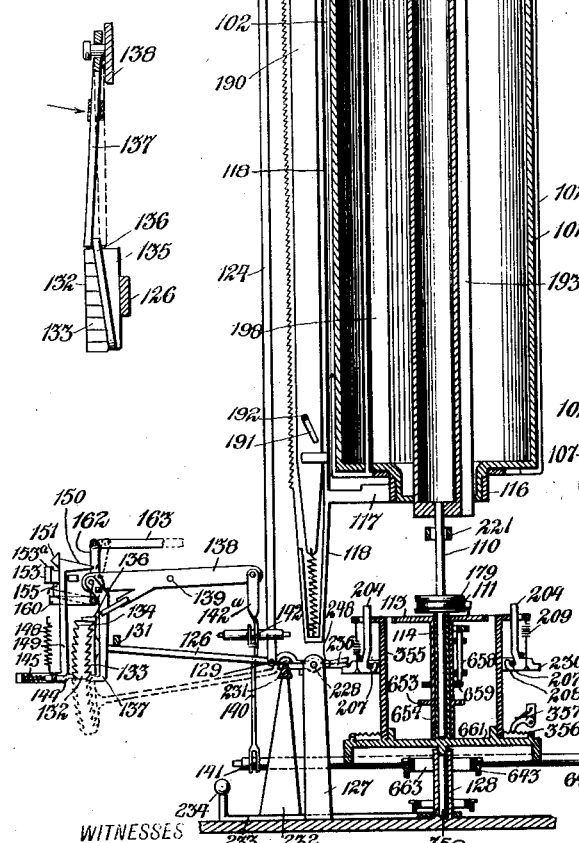
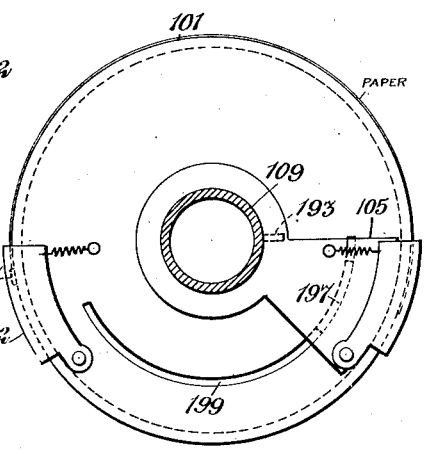
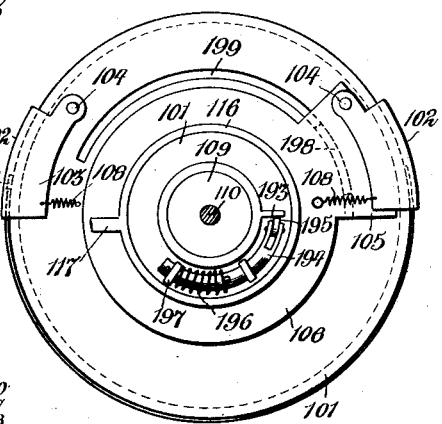
INVENTOR
Pedro Roble
BY
ATTORNEYS P. ROBLE.
TYPEWRITING MACHINE.
APPLICATION FILED MAR. 4, 1915. RENEWED OCT. 18, 1919.
1,339,369.
Patented May 4, 1920.
17 SHEETS—SHEET 5.
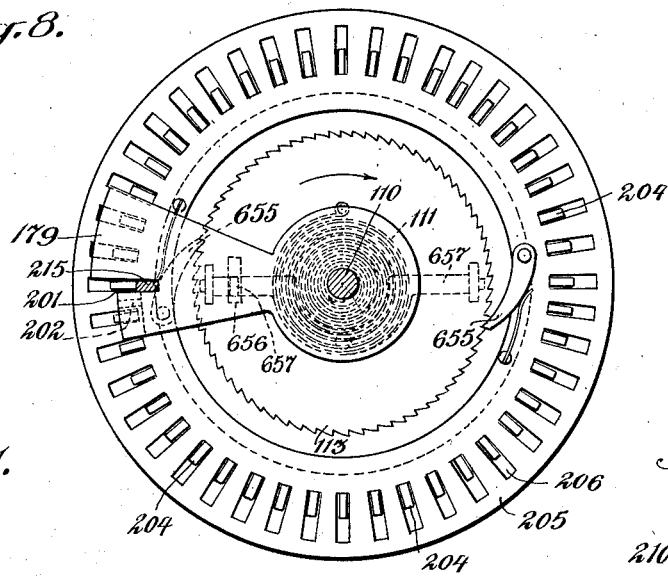
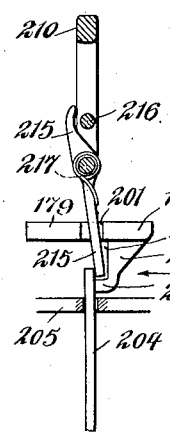
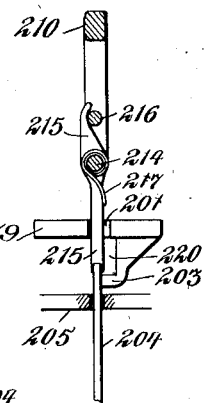
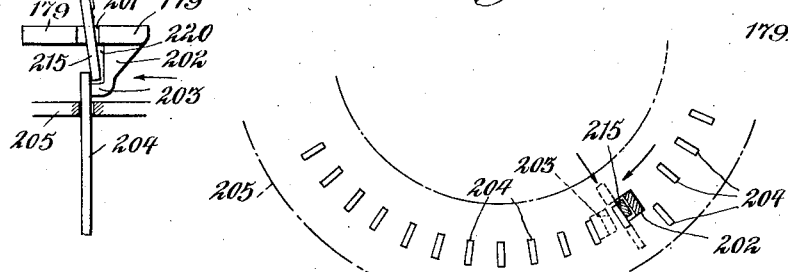
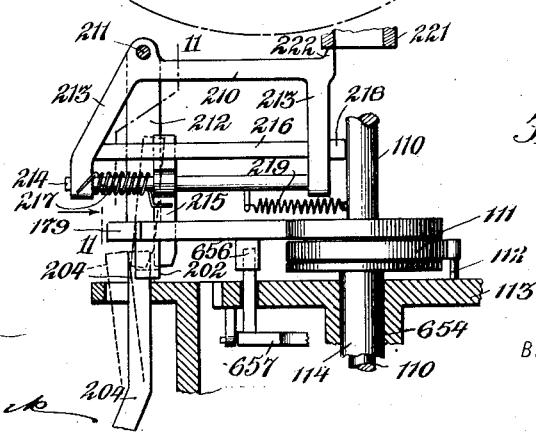
WITNESSES
INVENTOR
Pedro Roble
BY
ATTORNEYS P. ROBLE.
TYPEWRITING MACHINE.
APPLICATION FILED MAR. 4, 1915. RENEWED OCT. 18, 1919.

1,339,369.

Patented May 4, 1920.
17 SHEETS—SHEET 6.

WITNESSES

INVENTOR
Pedro Roble
BY
ATTORNEYS

P. ROBLE.
TYPEWRITING MACHINE.
APPLICATION FILED MAR. 4, 1915. RENEWED OCT. 18, 1919.

1,339,369.

Patented May 4, 1920.
17 SHEETS—SHEET 7.

WITNESSES

INVENTOR
Pedro Roble
BY
ATTORNEYS

P. ROBLE.
TYPEWRITING MACHINE.
APPLICATION FILED MAR. 4, 1915. RENEWED OCT. 18, 1919.
1,339,369.
Patented May 4, 1920.
17 SHEETS—SHEET 8.
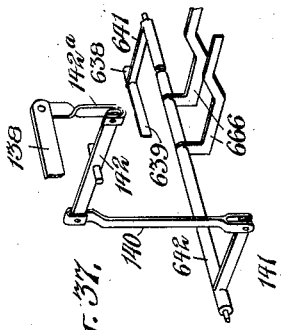
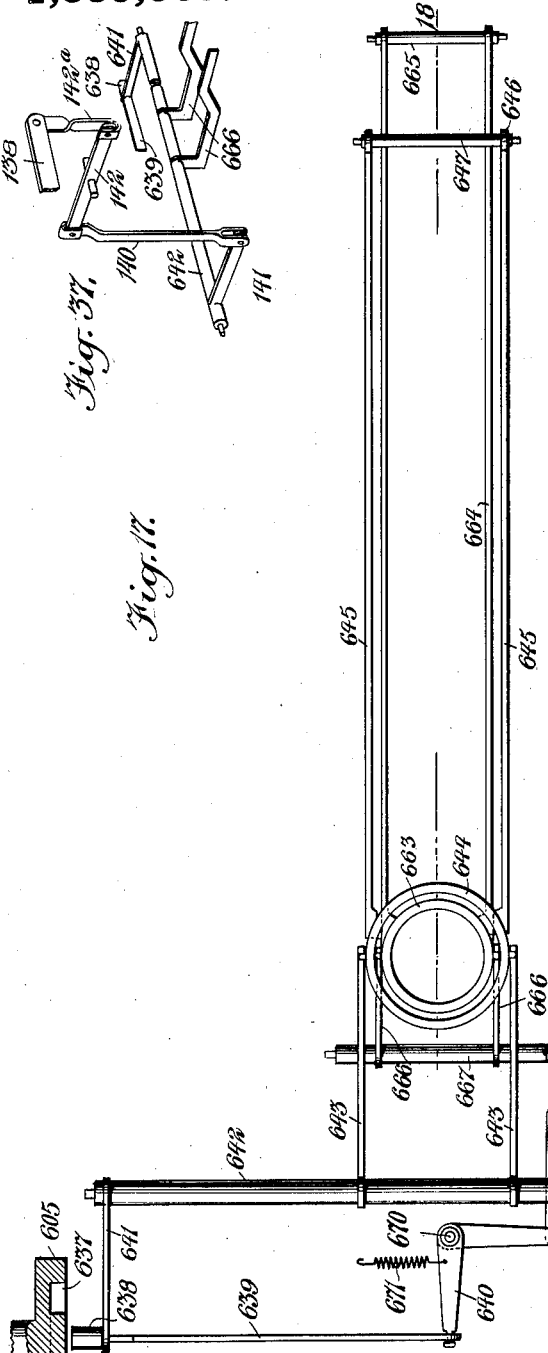
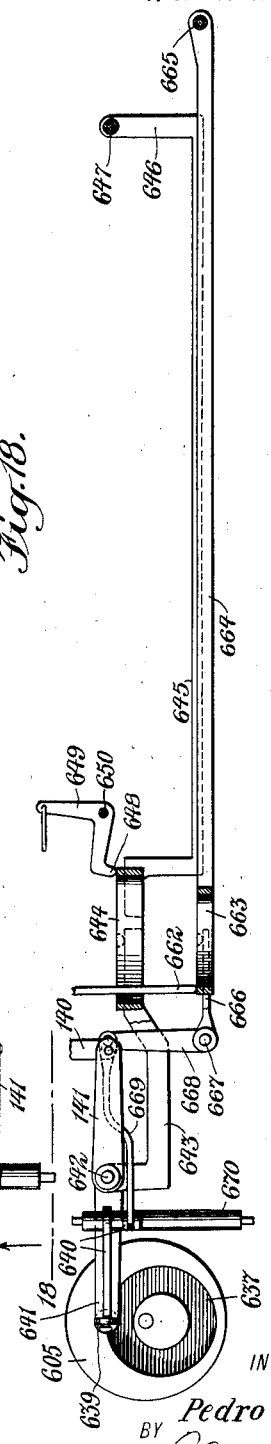
INVENTOR
Pedro Roble
BY
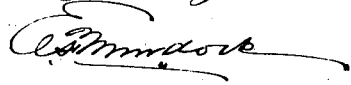
ATTORNEYS P. ROBLE.
TYPEWRITING MACHINE.
APPLICATION FILED MAR. 4, 1915. RENEWED OCT. 18, 1919.

1,339,369.

Patented May 4, 1920.
17 SHEETS—SHEET 9.

WITNESSES

INVENTOR
Pedro Roble
BY
ATTORNEYS

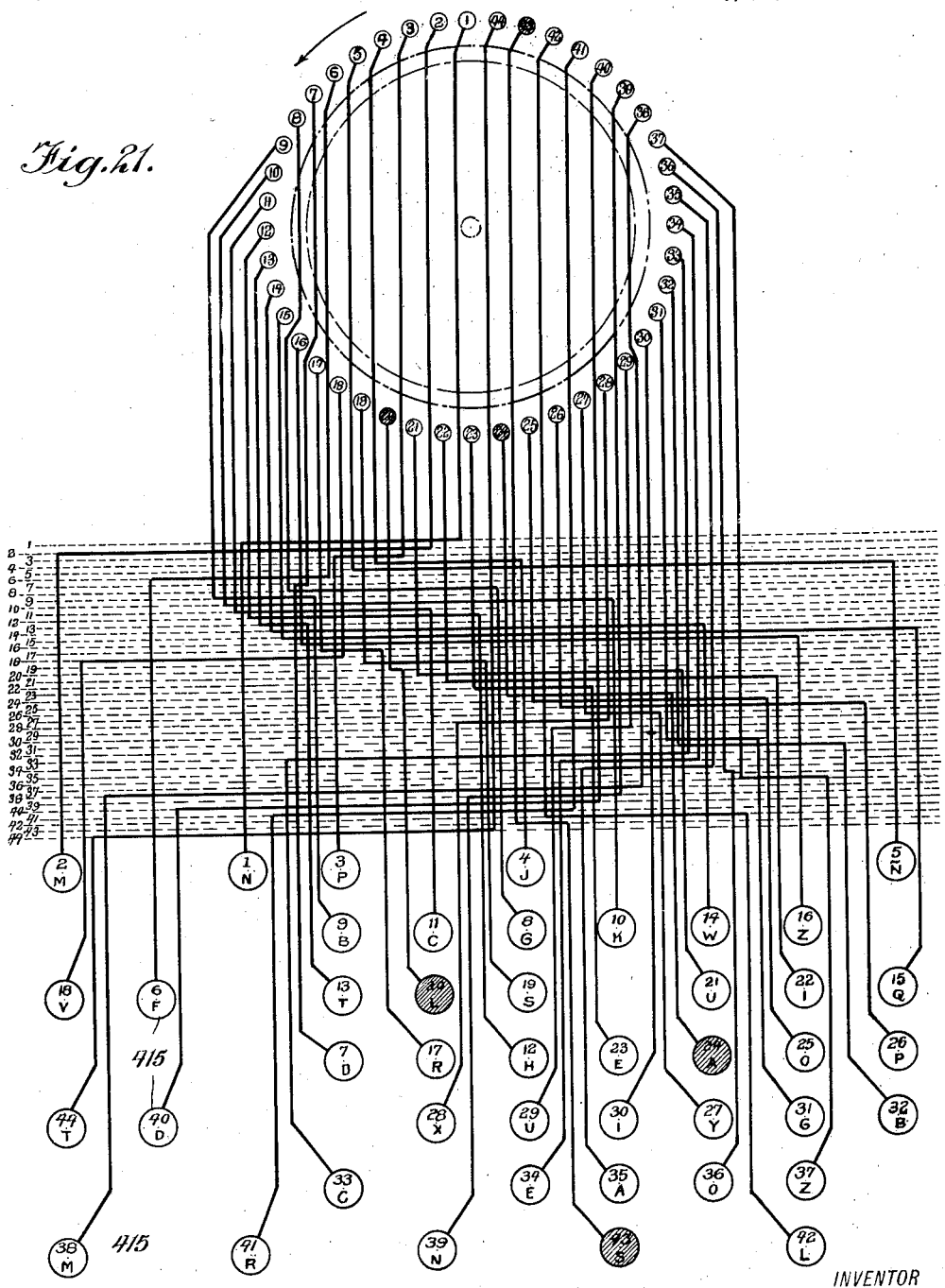

P. ROBLE.
TYPEWRITING MACHINE.
APPLICATION FILED MAR. 4, 1915. RENEWED OCT. 18, 1919.

1,339,369.

Patented May 4, 1920.

WITNESSES

INVENTOR
Pedro Roble
BY
ATTORNEYS

P. ROBLE.
TYPEWRITING MACHINE.
APPLICATION FILED MAR. 4, 1915. RENEWED OCT. 18, 1919.
1,339,369.
Patented May 4, 1920.
17 SHEETS—SHEET 12.
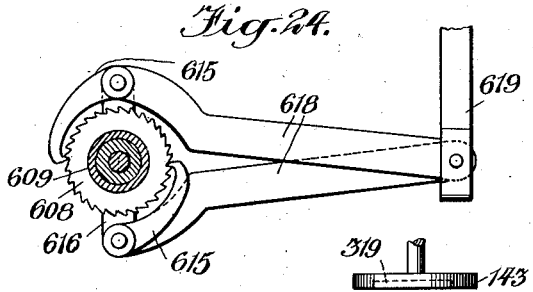
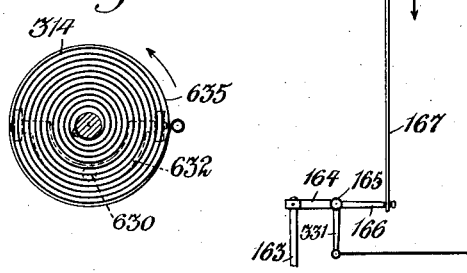
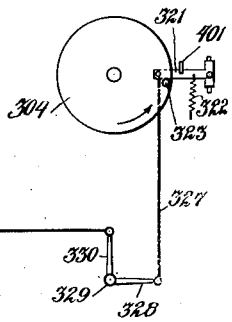
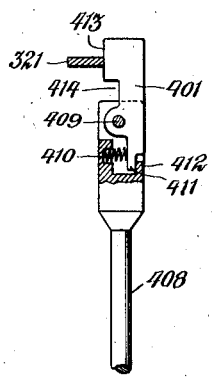
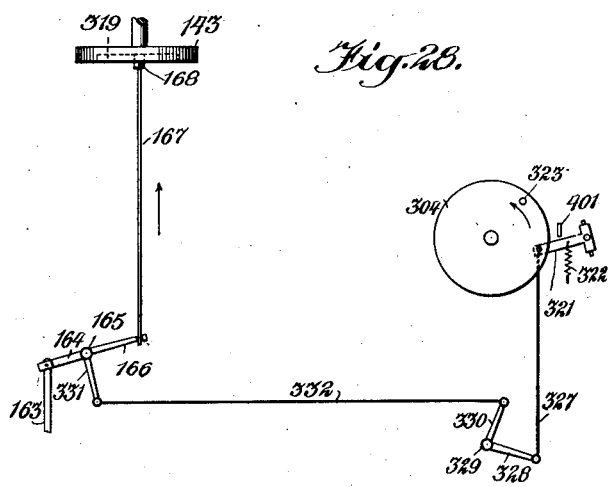
WITNESSES
INVENTOR
Pedro Roble
BY
ATTORNEYS

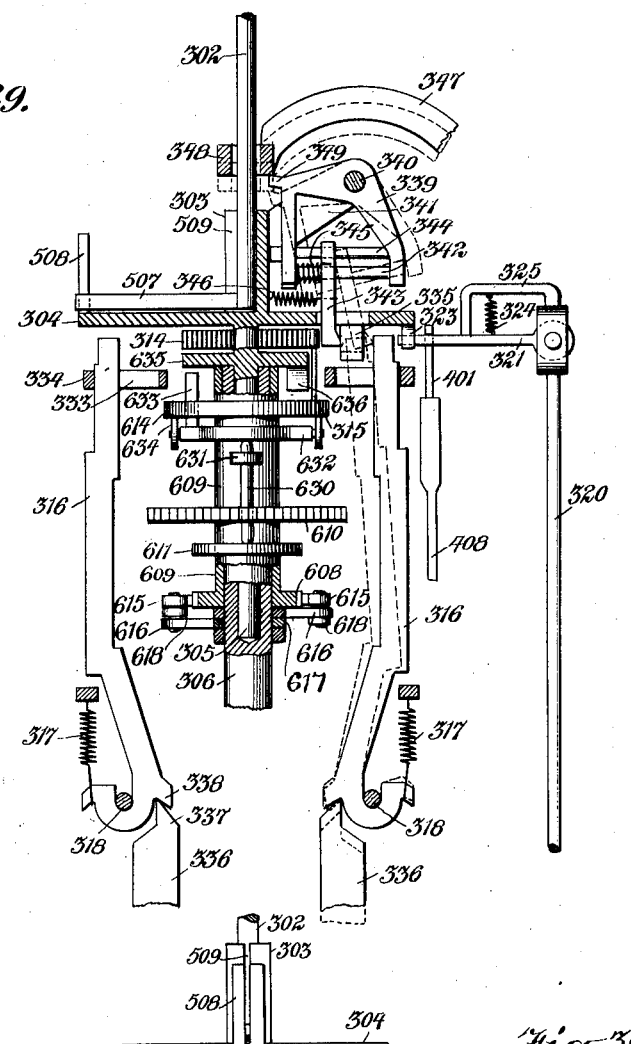

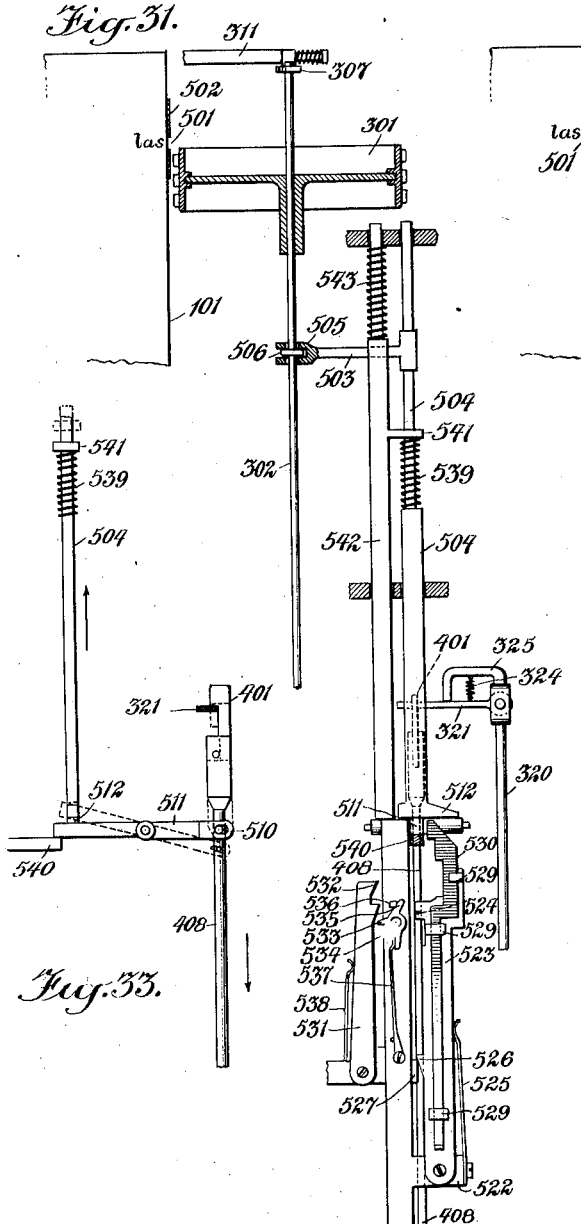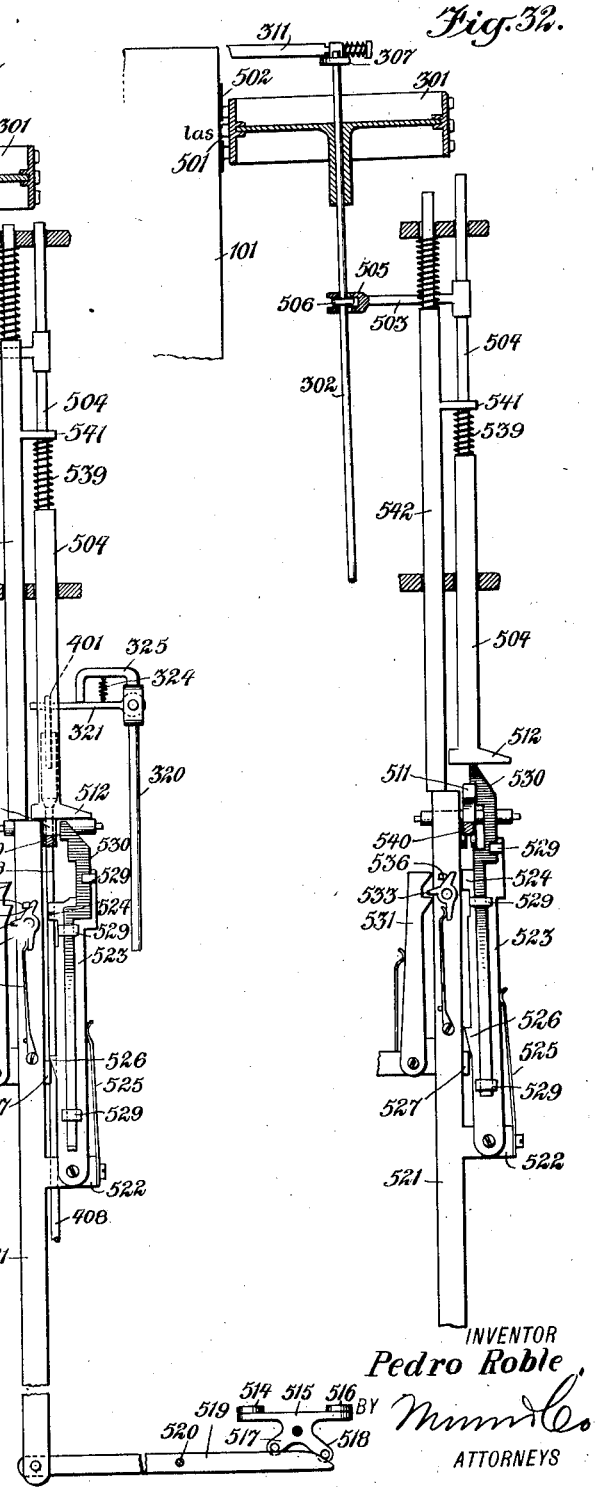

INVENTOR
Pedro Roble

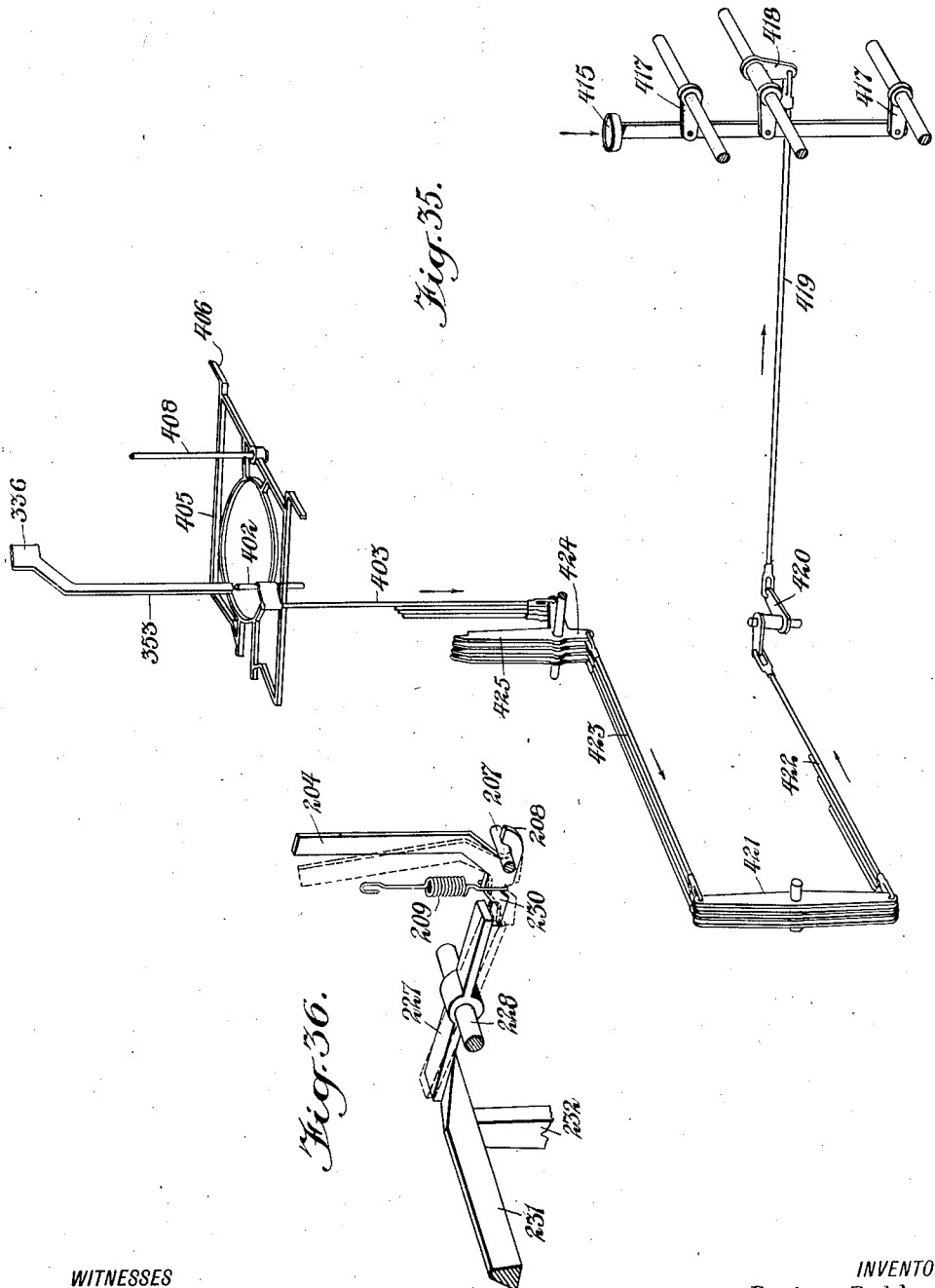

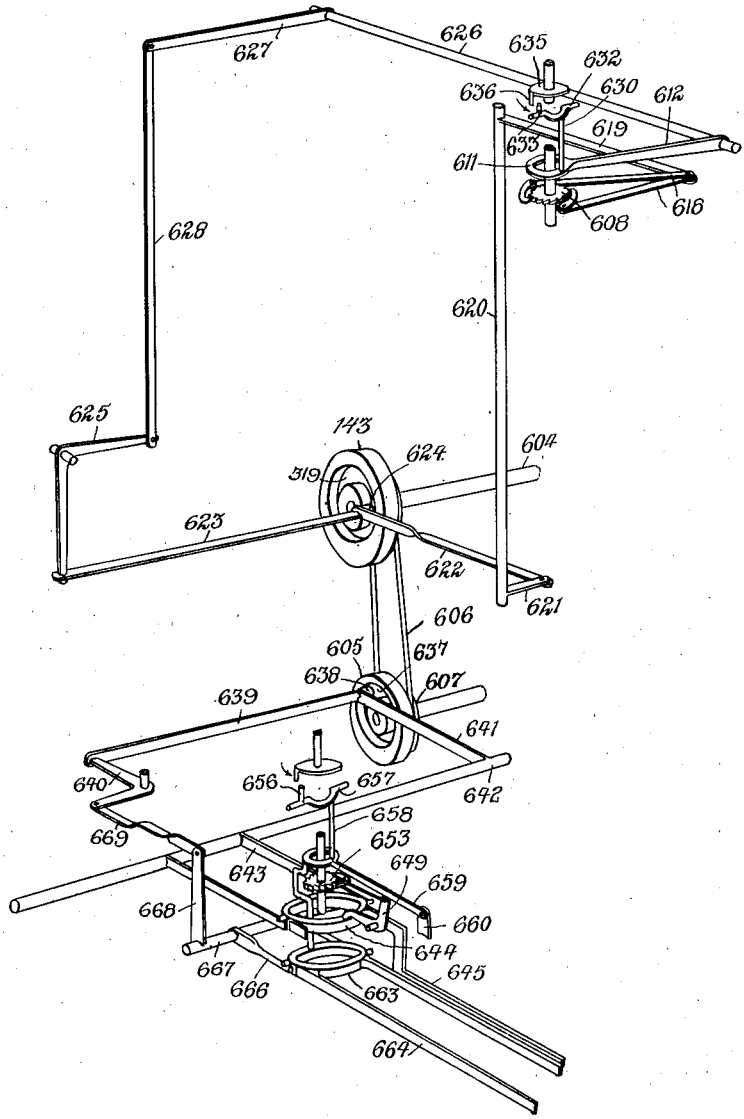

UNITED STATES PATENT OFFICE.

PEDRO ROBLE, OF BOGOTA, COLOMBIA.

TYPEWRITING-MACHINE.

1,339,369.　　　　　　Specification of Letters Patent.　　Patented May 4, 1920.

Application filed March 4, 1915, Serial No. 12,079. Renewed October 18, 1919. Serial No. 331,742.

*To all whom it may concern:*

Be it known that I, PEDRO ROBLE, a citizen of the Republic of Colombia, and a resident of Bogota, Colombia, South America, have invented a new and Improved Typewriting-Machine, of which the following is a full, clear, and exact description.

Among the principal objects which the present invention has in view are: to provide a machine for automatically and serially printing a group of letters; to provide a machine for automatically shifting the lines to be printed; to provide means for augmenting the letter-printing capacity; to provide a key-board arranged for grouped printing; to provide means for augmenting and limiting the marginal width of sheets on which printing is to be executed; to provide a selective key-board disposed in accordance with a system wherein the consonants and vowels forming syllables are arranged in their natural order or sequence; to provide a platen whereon paper is arranged in fixed relation for affording increased facilities for proof reading the printed matter prior to disturbing its relation to the printing mechanism of the machine; to provide a printing member having a multiplicity of alphabetic characters, said characters being arranged in groups corresponding with the automatic action of the printing mechanism; to provide means for automatically shifting the line-printing, thus avoiding interruption of the manual manipulation of the key-board; and to provide a power-driven machine of the character mentioned.

Drawings.

Fig. 2 is a top plan view of a machine constructed and arranged in accordance with the present invention;

Fig. 3 is a skeleton view showing in perspective the platen, a type wheel for printing upon paper held thereon, and operating and controlling members for said platen and said wheel;

Fig. 4 is an end view of a platen constructed and arranged in accordance with the present invention, the view showing the upper end thereof;

Fig. 5 is a view showing the lower end of said platen;

Fig. 6 is a vertical section of the platen, showing the operating mechanism thereof connected therewith;

Fig. 7 is a detail view on an enlarged scale, showing the ratchet teeth for adjusting the elevating mechanism to obtain a varied result in the shift of the platen;

Fig. 8 is a detail view on an enlarged scale, of the feed plate for said platen, showing in connection therewith a normal margin-fixing device;

Fig. 9 is a similar view showing a fragment of the escapement ring, diagrammatically indicating the operating positions of the controlling stops for said escapement ring;

Fig. 10 is a detail view on an enlarged scale, showing the operating mechanism for controlling the stop mechanism of said ring.

Fig. 11 is a detail view in vertical section, taken on the line 11—11 in Fig. 10, showing the element provided for arresting the movement of said ring in active position, and the releasing element therefore in alert inactive position;

Fig. 12 is a similar view showing the releasing element in active position;

Fig. 17 is a detail view in plan of the spring drive of the platen;

Fig. 18 is a side view of the same, partly in section, the section being taken on the line 18—18 in Fig. 17;

Fig. 21 is a diagrammatic view showing the connection between the members of the key-board and the selective type wheel arresters;

Fig. 24 is a detail view on an enlarged scale, showing a portion of the winding mechanism for the printing wheel;

Fig. 25 is a detail view in plan of the operating spring for the printing wheel;

Fig. 26 is a detail view on an enlarged scale of the printing wheel releasing mechanism;

Fig. 27 is a diagrammatic view showing the mechanism for releasing and arresting the printing wheel, the same being shown in inactive position;

Fig. 28 is a similar view showing the parts in their active position;

Fig. 29 is a detail view on an enlarged scale of the printing wheel driving and controlling mechanism, certain of the parts being shown in section and others partly cut away to expose the mechanism normally covered thereby;

Fig. 30 is a detail view on an enlarged scale showing part of the releasing mechanism of the printing wheel driving mechanism;

Fig. 31 is a skeleton view of the printing wheel and operating and controlling mechanism therefor, the same being shown in their usual inactive position and when employing the top line of type;

Fig. 32 is a similar view showing the mechanism in condition to register the second line of type with the printing position;

Fig. 33 is a detail view on an enlarged scale showing the operative connection between the printing wheel releasing member and the line-printing shifting mechanism;

Fig. 35 is a skeleton view in perspective, showing the arrangement of a manually-operated key, locking devices, and the setting mechanism for the printing wheel arresters;

Fig. 36 is a detail view on an enlarged scale, showing the active and inactive positions of an escapement plate and means for manually setting the same in operative position;

Fig. 37 is a detail view in perspective showing the intermediate mechanism operatively connecting the prime mover and the spring motor for operating the platen when released;

Fig. 38 is a detail view in perspective showing the power-compensating mechanism of the letter-spacing and printing mechanism.

Figure 1:
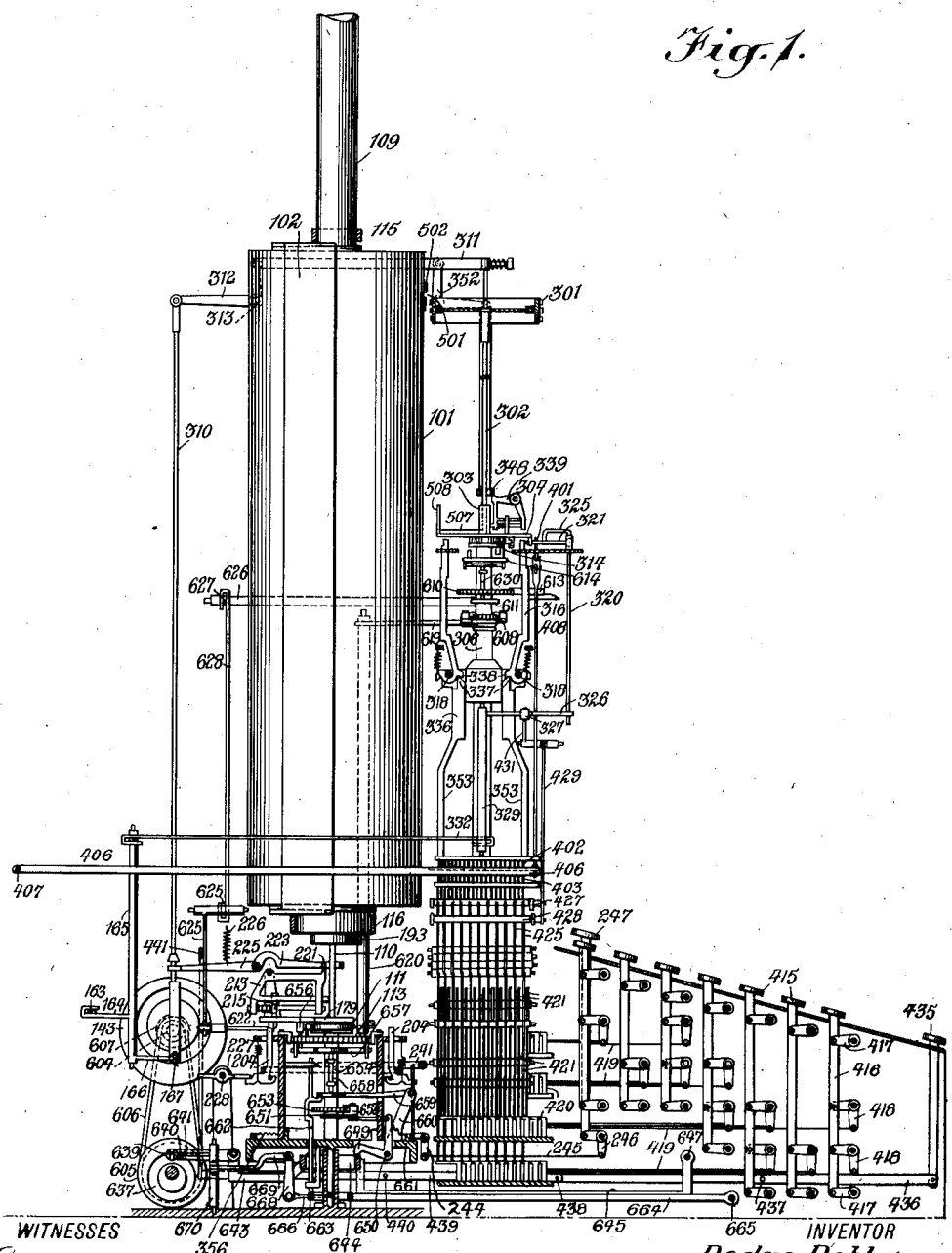
Figure 1 is a skeleton view showing in side elevation a machine constructed and arranged in accordance with the present invention, certain elements being omitted and parts of the frame being disclosed in section.

The present machine comprises several groups of elements or instrumentalities cooperating to common ends. To indicate the association of each element in the assembled machine to one or other of these groups, the elements or instrumentalities of each group are assigned connoted designating numerals. Thus, numerals from 100 to 200 are employed for designating the instrumentalities of what is herein termed the "line-spacing mechanism"; the numerals 200 to 300 are employed to designate the elements of the "letter-spacing mechanism"; numerals from 300 to 400 are assigned to the elements of the "printing mechanism"; numerals from 400 to 500 designate the parts of the "operating mechanism"; numerals 500 to 600 are assigned to the elements of the "printing position controlling mechanism"; and numerals 600 to 700 are employed for designating the members of the "power driving mechanism".

The machine herein disclosed is primarily employed to print by succesive automatic operations and in series, groups of letters forming words or parts of words. The arrangement of the letters is automatic and is the direct result of the design of a key-board for operating the machine and a type wheel which corresponds therewith. It is preferred to conduct the operation of printing by selecting the keys and letters which form syllables. Where it is desired, the operator may at will select groups of letters without reference to their syllabic arrangement. In this way it is unnecessary for a word to be syllabized by the operator. In both methods, however, it will be found that the selection of the letters on the keyboard should conform to certain provisions of the key-board.

In the present disclosure two distinct banks of keys are employed. Any number of letters may be printed in groups, but if the successive arrangement of the letters on the key-board does not correspond with the successive arrangement of the type to be used, then the letter which does not conform in arrangement must be found in an upper or lower bank.

Thus, if the letters l, a, s, should be wanted, if they were used in a single bank the types would print "als". To correct this, the operator depresses the "l" in the upper bank and "a" and "s" in the lower bank. As hereinafter disclosed, the banks or groups of keys in the key-board have a counterpart arrangement in the printing type wheel. As a result, when the operator depresses the keys in the manner set forth, the automatic printing will follow the order of the banks, and the syllable "las" will be printed.

If the machine and the printing mechanism thereof are speeded, it is obvious that the length of time required for printing would be substantially curtailed.

*Line spacing mechanism.*

In the present machine the platen consists primarily of a cylinder 101. The cylinder 101, as shown best in Fig. 6 of the drawings, is hollow. The diameter of the cylinder 101 may be varied. The design is to have a circumferential dimension somewhat greater than the conventional width of paper used in business. The length of the cylinder 101 is slightly greater than the length of the paper referred to. The paper is secured upon the cylinder by clip bars 102. The bars 102 are of suitable width and have hinge lugs 103, tabs from the ends of which receive pivot pins 104. The pivot pin 104 on one bar 102 is permanently attached to the ends of the cylinder 101. The pin 104 of the other clip bar is permanently attached to an extension 105 set out from adjusting heads 106. The adjusting heads 106 are moved at will, the object being to accommodate papers of different sizes.

When introducing the paper on the cylinder, the clip bar 102 at the right of the cylinder (at the left in Fig. 4 of the drawings) is preliminarily lifted. The right-hand edge of the paper is then introduced beneath said clip bar until arrested by a gage stop 107. The gage stop 107 is permanently attached to the clip bar 102 and determines the normal margin at the right of the paper. After the clip bar 102 at the right of the paper has clamped and firmly holds the same on the cylinder 101, the opposite clip bar 102 is lifted and the left-hand edge of the paper is slipped thereunder. It is at this time that the heads 106 are adjusted to the width of the paper which it is desired to use. The clip bars 102 are both held in service position by pull springs 108, as seen best in Fig. 5 of the drawings.

The cylinder 101 is in service supported by a vertical shaft 109. The shaft 109 is longer than the cylinder 101, being employed as a guide as well as a driving member for said cylinder. Said shaft extends through perforations provided in the heads of said cylinder and is rigidly mounted on a spindle shaft 110, with which a motor spring 111 is actively connected. The spring 111 is best shown in Fig. 10 of the drawings, together with an anchor pin 112 for securing the same on a ratchet wheel 113, which is mounted on a socket post 114. At this time it should suffice to state that the winding mechanism is provided for automatically winding said spring. The spring being wound, the cylinder 101 is constantly alert and under tension to rotate in one direction.

The cylinder 101 is supported rotatively in collars 115 and 116. The collars 115 and 116 are connected by means of bracket arms 117 with an upright bar 118. The bar 118 is provided at the outer edge with down-set ratchet teeth 119. With the ratchet teeth 119, a pawl 120 pivotally mounted at the end of a rocking bar 121, engages. The rocking bar 121 is definitely pivoted by a pin which passes through an eyelet 122 at the end of said bar removed from the pawl 120. The pawl 120 is normally maintained in contact with the teeth 119 by a short flat spring 123, as seen best in Fig. 6 of the drawings. The pawl-provided end of the bar 121 is in turn supported by a lift-rod 124, with which it is connected by a sliding collar 125.

The rod 124 supports a spacing lever 126. The lever 126 is supported on the standard 127 by a curved rod 248. The lever 126 and the rod 124 are pivotally coupled by a pin 129. The rod 124 and lever 126 connected therewith are lifted by a spring 130 until arrested by a stop bar 131.

The lever 126 is provided with a ratchet head 132. The head 132 has a double-edged, ratchet-toothed extension, on one face whereof are formed teeth 133, and on the opposite face whereof are formed teeth 134. The member having the teeth 133 and 134 is separated from a smooth surface extension 135 by a standing flange 136. The flange 136 is inclined, as shown best in Fig. 7 of the drawings, and is designed as a deflector or guide for a pawl 137 to prevent the engagement thereof with said extension when the lever 126 is elevated. The pawl 137 operates as a feed member to engage the teeth 133 of the head 132. The pawl 137 has at its lower end a tooth adapted to engage the teeth 133 of the head 132, as best seen in Fig. 6 of the drawings. The pawl 137 is pivotally mounted on the free end of a rocking lever 138, which lever is pivotally mounted on a pin 139, and is connected with a power mechanism by means of a link 140, arm 141, rocking lever 142 and link 142ª. By the operation of said power mechanism, hereinafter described, the arm 141, the link 140, and the lever 142 are rocked, and the lever 138 by means of the link 142ª is moved to raise and lower the pawl 137 the height of one of the teeth 133.

It is obvious that with each reciprocation of the pawl 137 the head 132 of the lever 126 is forced to a relatively lowered position until the tooth of the pawl 137 passes above the double ratchet toothed member and the flange 136. During the descent of the head 132 the spring latch bolt 144 engages successively the teeth 134 on the opposite side of the member on which the teeth 133 are formed.

Figure 15:
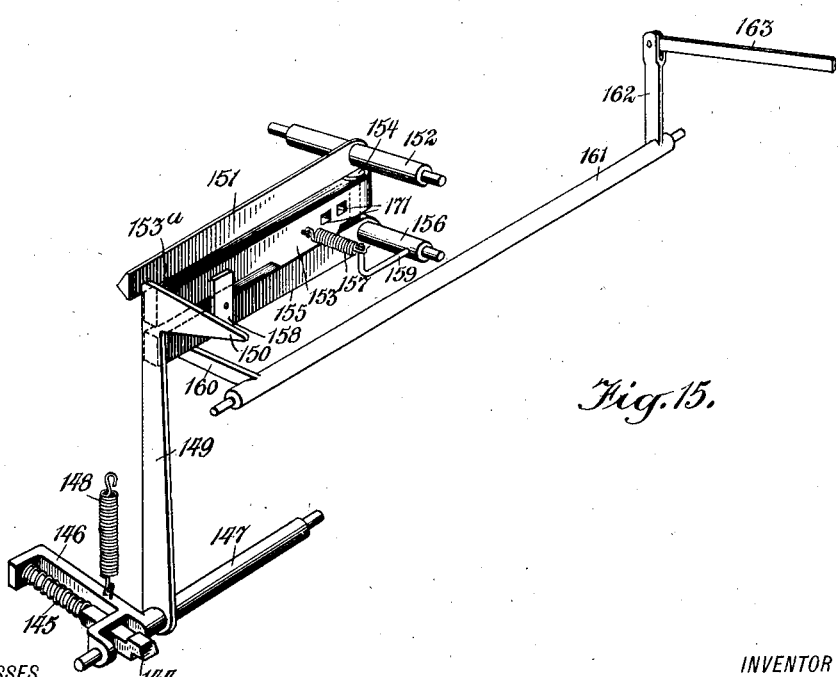
Fig. 15 is a detail view on an enlarged scale, showing a portion of the line-spacing mechanism for said platen.

The bolt 144 is advanced by a compression spring 145, best seen in Fig. 15 of the drawings. Said spring yields for correspondence with the lateral displacement of the bolt 144. The bracket 146 in which the bolt 144 is mounted is rigidly connected with a rocking shaft 147, and extends laterally therefrom. The bracket 146 is supported under tension by a pull spring 148, which normally tends to rock the shaft 147 so that an arm 149 and the wedge-head 150 thereof tend to move toward the head 132.

Opposed to the tendency of the shaft 147 and parts connected therewith to rock the arm 149 toward the head 132, there is provided a more powerful spring 130 on the lever 126. The pressure exerted by said spring 130 produces a tendency in the shaft 147 and the arm 149 to rock backward or away from the head 132. The latter tendency, resultant from the pull of the spring 130, is counteracted by a latch arm 151, which is normally held in the path of and behind the heel of the wedge head 150, as best shown in Fig. 15 of the drawings.

When, in the course of operation, the head 132 has been step by step depressed by the pawl 137 until the bolt 144 extends above the last one of the teeth 134, the pawl 120 has been lowered to its extreme and is engaged with the teeth 119 of the bar 118. The mechanism is held ready and alert for the operation which lifts the cylinder 101 to the next succeeding line-printing station of said cylinder. The parts thus enumerated are held in this position by the latch arm 151.

The latch arm 151 is pivotally mounted on a pivot shaft 152, and normally rests extended above and in juxtaposed relation to a swinging insert arm 153. The arm 153 has a block projection 153ª to interfere in the path of the latch arm 151, when moved between said arm 151 and the rocking arm 155. The arm 153 is hinged by a pin 154 to swing in a horizontal plane between the latch arm 151 and the rocking arm 155. The arm 155 is pivotally mounted by a shaft 156 and supports the pivot pin 154, as shown best in Fig. 15 of the drawings.

The insert arm 153 and the rocking arm 155 are normally maintained in superposed relation by a spring 157 and a stop plate 158. The spring 157 is anchored to the side of the insert arm 153 and to a bracket pin 159 rigidly secured to and set out from the shaft 156. When not otherwise controlled, the insert arm 153 is moved by the spring 157 between the latch arm 151 and the rocking arm 155.

To lift the arm 155 is the office of an arm 160, shown best in Fig. 2, 6 and 15 of the drawings. The arm 160 is laterally extended from a rocking shaft 161, which is provided with an upstanding arm 162. The arm 162 is connected through a link 163 to a vertical shaft 165, to which shaft the link 163 is connected by means of a laterally-extending arm 164.

At a lower level on the shaft 165, as best seen in Fig. 3 of the drawings, is a second laterally-extending arm 166, which reciprocates a connecting arm 167. The free end of the arm 167 is provided with a roller 168, the office of which is to engage the driving mechanism for operating the type wheel of the printing mechanism, later described.

It is when the roller 168 is disengaged from the driving mechanism referred to, that the arm 160 is rocked in an upward direction. As disclosed hereinafter, this action occurs at the completion of the printing of each syllable or group of letters.

The arm 160 supports the free end of the rocking arm 155, with the result that each time the arm 160 is lifted as an incident to the completion of the syllabic or group printing referred to, the arm 155 is likewise lifted. If at this time the insert arm 153 has been moved between the rocking arm 155 and the latch arm 151, the latter is also lifted. The end of the arm 151 is moved to clear the wedge head 150. This permits the spring 130 to overcome the spring 148, and to rock the shaft 147 and arm 149, so that the latch bolt 144 is disengaged from the teeth 134 of the head 132.

The release of the head 132 permits the lever 126 and rod 124 connected therewith, to lift, to the end that the bar 118 and cylinder 101 are raised by the pawl 120 on the shaft 109, to change the position of said cylinder relative to the operating station of the printing type wheel with which the present machine is provided.

The action just described, whereby the insert arm 153 assists in the lift of the latch arm 151, is controlled by a thrust bar 169, the free end of which is bifurcated to form forks 170, which forks extend through perforations 171 formed in the insert arm 153, which perforations are seen best in Fig. 15 of the drawings. The opposite end of the thrust bar 169 is pivotally connected with a bell crank lever 172.

Figure 14:
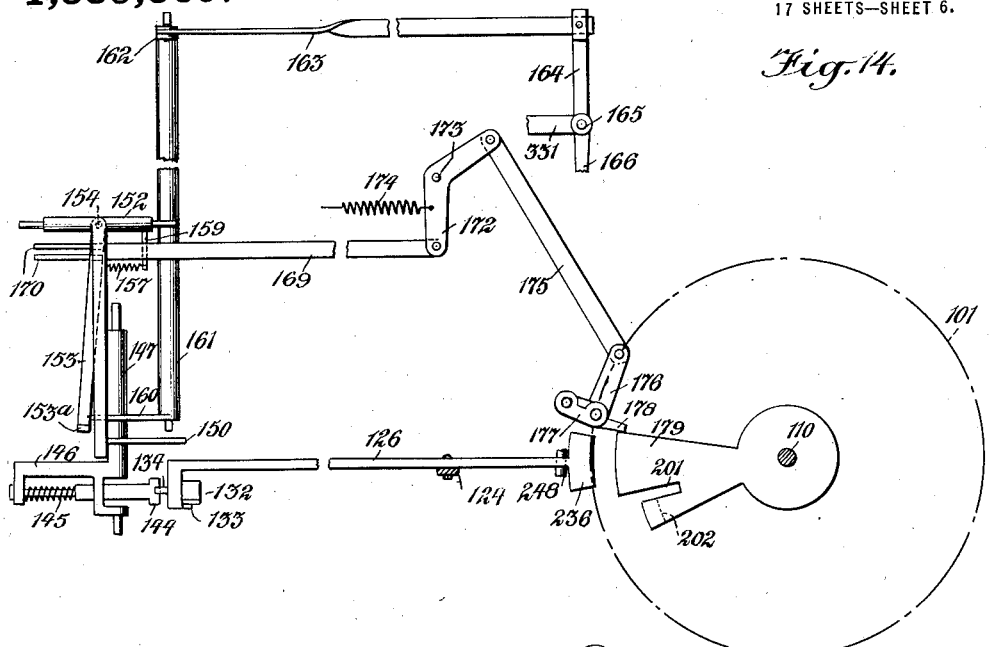
Fig. 14 is a detail view on an enlarged scale and partly diagrammatic in character, showing means for normally releasing the platen, together with a portion of the mechanism for varying the operation of the margin.

The lever 172 is mounted on a pivot pin 173, and is controlled by a pull spring 174, which normally moves the thrust bar 169 against the insert arm 153 to hold the latter out of the path of the rocking arm 155, as best seen in Fig. 14 of the drawings. The lever 172 is operatively connected by means of a link bar 175 with an extension arm 176 of a rocking lever 177. The lever 177 has a toe 178, which normally extends into the path of a controlling sector 179.

In the rotation of the cylinder 101, hereinafter described, the sector 179 travels a complete circle. It is so arranged that just prior to the completion of the normal end of each line of printing, the sector 179 reaches the toe 178 of the rocking lever 177. The succeeding movement of said sector coincident with the printing of the last syllable, or group, of said line or printing, moves the lever 177 and transmission mechanism connected therewith, to retract the thrust bar 169. This permits the subsequent functioning of the insert arm 153 at the completion of the printing of the last syllable and the consequent escape of the wedge head 150, the bolt 144, the head 132, and lever 126, when the spring 130 operates to lift the cylinder 101 preparatory to printing a new line.

Attention is drawn to the fact that the action of the pawl 137 and teeth 133 establishes a certain movement on the part of the head 132 and the lever 126. The distance to which the lever 126 depresses the pawl 120 may be termed the unit or single space of the line spacing mechanism. The spaces are increased by shifting the sliding collar 125 to the left, so that the spring latch 180 registers with the nicks 181 or 182. Said nicks 181 and 182 being progressively nearer the pivot on which the rocking bar 121 swings, the arc of movement of the free end thereof carrying the pawl 120 is proportionately augmented. The adjustment of the collar 125 and the latch 180 thereof is manually effected.

In correspondence with the operation of the pawl 120, and to maintain the elevated position to which said pawl lifts the cylinder 101, a pawl 183 is provided. Said pawl 183 engages the ratchet teeth 119 to maintain the lifted position of, and support, said cylinder. The pawl 183 is held alert to engage the ratchet teeth 119 by a small flat spring 184.

Extending laterally from the upper end of the bar 118, rigidly and integrally secured thereto, is a relatively stationary handle member 185. A relatively movable handle member 186 is pivotally mounted on a standard 187, which is mounted on the handle member 185 midway the ends thereof. The end of the handle member 186 has an elongated slot 188, through which a pin 189 extends. The pin 189 is set out from the side of a fender bar 190. The bar 190 operates to engage the pawls 120 and 183 to force the same backward out of engagement with the ratchet teeth 119. To this end, the fender bar 190 is provided at the upper and lower ends with inclined, elongated slots 191. Extending from the side of the bar 118 and through the slots 191 are guide pins 192.

From the foregoing it will be seen that when the free ends of the handle members 185 and 186 are drawn together the fender bar 190 is lifted. The fender bar 190 is forced forward by the pins 192 in the slots 191. The ends of the pawls 120 and 183 are then lifted from the teeth 119, and the cylinder 101 is free to be moved up or down on the shaft 109, either for adjustment thereof or for removal therefrom.

At the completion of the printing of each sheet the cylinder 101 is removed totally from the shaft 109 or lifted to a position thereon removed from the zone of interference by the remainder of the mechanism. When the cylinder 101 has been newly equipped with paper, the clips 102 being manipulated in the manner above described, the handle members 185 and 186 are drawn together to cover or protect the teeth 119. The bar 190 then operates to fend off or press back said pawls, so that the operator is free to move the cylinder 101 to the lowest position thereof or to any intermediate position desired for the beginning of the operation of printing.

The cylinder 101 is guided in its adjustment on the shaft 109 by a long fin 193, which is set out from and rigidly mounted on the side of the shaft 109. A suitable slot is provided for the fin 193 at the lower end of said cylinder, as shown best in Fig. 6 of the drawings. The fin 193 is further utilized to steady the cylinder on the shaft 109, this being accomplished by a thrust rod 194, a friction roller 195 mounted thereon, and a spiral spring 196, which encircles the rod 194 to bear against a bearing stud 197. As seen best in Fig. 5 of the drawings, the spring 196 presses constantly against the side of the fin 193, thereby exerting a constant and steadying pressure thereon to hold the cylinder 101 from any loose or vibrating movement.

As seen best in Fig. 6 of the drawings, the upper and lower extensions 105 are connected by a flat bar 198, which rigidly unites said extensions and secures uniformity of action thereof. To permit the circular movement of the bar 198 the heads of the cylinder 101 are provided with curved slots 199, as seen best in Figs. 4 and 5 of the drawings.

*Letter spacing mechanism.*

In the preceding division, it has been shown how the paper is installed in service, and how the line space, having been manually provided for, is automatically effected, as well as how the paper, after having been printed upon, is removed from the machine. Further, it has been indicated that the automatic line shift described is dependent upon the rotation of the platen cylinder with which is operatively connected the actuating member for inaugurating the operation of the line spacing mechanism.

The sector 179 is rigidly mounted on the shaft 110, to be moved therewith by the motor spring 111. At the rear of said sector is formed an open-ended slot 201. At the rear or following side of the slot 201 the body of the sector is slightly shortened. Depending from said shortened portion, at the outer edge thereof, is an arm 202. The arm 202 is provided with an abutment tooth 203, the office whereof is to engage escapement plates 204. The escapement plates 204 are spaced apart, as shown best in Figs. 8, 9 and 13 of the drawings, for governing the rotary advance of the platen cylinder 101. The abutment tooth 203 travels in the path of the escapement plates 204, the sector 179, of which the arm 203 is a part, being driven with the cylinder by the spring 111.

The plates 204 are held by a ring 205, which has a series of slots 206 for holding said plates 204. The slots 206 are elongated to provide ample travel for the plates 204, to permit the removal of said plates from the path of the arm 202 and tooth 203 thereof.

The escapement plates, as best shown in Figs. 1, 6 and 36 of the drawings, are pivotally mounted on a ring 207, each plate being provided with a hook 208 to extend below said ring. Said hook is held in engagement with said ring by springs 209.

The springs 209 normally hold the plates 204 at the inner ends of the slots 206. The position of the plates 204 is best shown in Figs. 8, 9 and 10 of the drawings. The normal position of the plates being coincident with the path of the arm 202 and of the tooth 203 thereof, it will be seen that as each plate 204 is moved from engagement with the tooth 203 it is permitted to advance.

The removal of the successive plates 204 from the path of the tooth 203 is effected by a cradle 210. The cradle 210, as shown best in Fig. 10 of the drawings, is pivotally mounted on a shaft 211 between spindles 212 raised above and carried by the sector 179. The cradle 210 is provided with pendent arms 213, between the lower ends whereof extends a shaft 214.

The shaft 214 is pivotally mounted in the arms 213 and has rigidly mounted thereon a kicker bar 215. The bar 215 has an upper and a lower extension, the end of the lower extension being normally disposed within the circle formed by the plates 204 when in their normal location, and in a plane below the upper ends of said plates. The upper extension forms a stop member for said bar, said end engaging a second brace 216. Against the brace 216, the upper end of the kicker bar 215 is normally pressed by a spring 217, which is coiled around the shaft 214.

The brace 216 has an inner end extension 218, which engages the shaft 110 to regulate the normal position of the cradle 210. The cradle 210 is locked in its working position by the operation of a spring 219. The spring 219 is anchored to the spindle shaft 210 and to a pin pendent from the shaft 214, as best seen in Fig. 10 of the drawings.

In Figs. 11 and 12 of the drawings is shown the operation of the kicker bar 215 and of the spring 217. In the operation of this mechanism the spring 111 moves the spindle shaft 110, the platen cylinder 101 and sector 179 with relative speed and violence. The action is so quick that the kicker bar 215 is still in line with the arm 202 and tooth 203 thereof when it engages the next succeeding plate 204. To clear the kicker bar 215 the arm 202 is provided with a recess 220, which receives the lower end of said kicker bar when forced back.

The kicker bar is now permitted to rock with the cradle 210, back to its active position inside of the circle of plates 204. As soon as the kicker bar 215 clears a plate 204, the spring 217 operates to rotate the kicker bar and the shaft 214 until arrested by the upper end of said kicker bar engaging the brace 216. This position is shown in Fig. 12 of the drawings, where it will be noticed that the lower end of the kicker bar 215 is related to the plate 204 in position to move the same from engagement with the tooth 203. The disengagement of each plate 204 is effected by rocking the cradle 210.

As in typewriting machines of conventional construction, the letter spacing is coincident with each operation of the printing mechanism. In the present machine, the cradle 210 is rocked by depressing a ring 221, which bears on the nub 222 at the rear or inner end of the cradle 210. The ring 221 is disposed at the end of a lever 223. The lever 23 is integral with a shaft 224, shown best in Figs. 1 and 3 of the drawings. The shaft 224 is operatively connected with a vibrating mechanism by an arm 225. The arm 225 is lifted to lower the ring 221 and rock the cradle 210. This action is normally balanced by the spring 226. The shaft 224 is rocked in time with the letter type printing mechanism, being operatively connected with the cam wheel 143, as shown best in Fig. 1 of the drawings.

As seen best in Fig. 10 of the drawings, the kicker bar 215 moves from the full-line position to the dotted-line position of said plate. The position indicated by the dotted lines in said figure of the drawings shows the plate 204 removed from the path of the arm 202 and tooth 203 thereof.

In this position the sector 179 and parts connected therewith are in position to rotate until the tooth 203 is engaged by the next succeeding plate 204, to be arrested thereby. It will be understood that as the letter type printing is automatic, so the operation of the type spacing mechanism is automatic in so far as the function above described is concerned.

In the foregoing section has been shown how the platen cylinder 101 is rotated step by step. The statement has also been made that this operation is in part automatic and is timed to the operation of the printing mechanism. It has also been shown that the sector 179 engages the lever 177 to release the line spacing mechanism.

Figure 13:
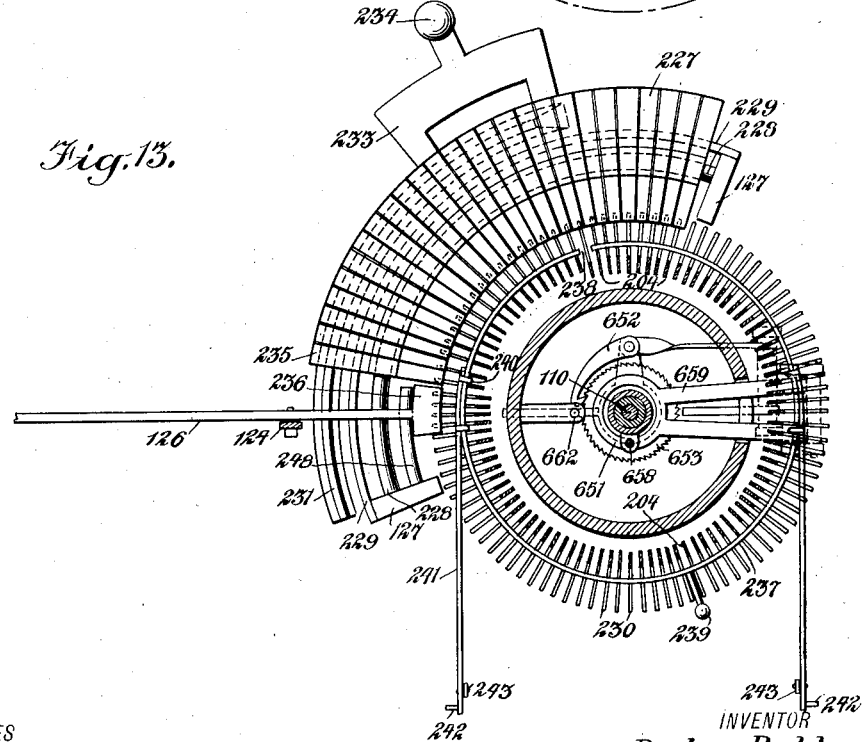
Fig. 13 is a detail view on an enlarged scale, showing in horizontal section the arresting members of the escapement ring and margin controls for operating the same.

To determine the left-hand margin of the printing, the plates 204 following the operating position of the lever 177 are removed to permit the tooth 203 to pass to the first of the series of plates 204 remaining in active position. The number of plates 204 placed in inactive position succeeding the operating position of the lever 177, is manually determined within a certain radius. This radius is coincident with key plates 227. The plates 227 are independently pivoted on a curved rod 228 extending between the standards 127. This construction is best seen in Fig. 13 of the drawings. The plates 227 normally rest on a rail 229, their inner ends being disposed above the outward extension 230 of the adjacent escapement plates 204, as seen best in Figs. 6 and 13 of the drawings.

The outer and longer ends of the key plates 227 are disposed in the path of a movable wedge-ended rail 231. When the rail 231 is inserted beneath any of the key plates 227 the outer ends of said plates are raised and the inner ends correspondingly lowered. The lowering of the inner ends of the plates 227 rocks the escapement plates 204 out of the path of the tooth 203 on the sector 179. The number of plates 227 held by the rail 231 regulates the rotary distance which the cylinder 101 will be moved by the spring 111 before being arrested. This movement, it will be understood, is coincident with or immediately subsequent to the operation of the sector 179 releasing the line-spacing mechanism. Therefore, the normal distance of travel regulated by the setting of the rail 231 is equal to the distance between the established right-hand margin of the paper being printed upon and the established left-hand margin thereof, it being understood that the rotation of the cylinder 101 is continuous and therefore moves relatively from the established right-hand margin to the established left-hand margin around that part of the cylinder 101 not provided with paper.

The rail 231 is mounted upon a standard 232 raised above a shaft plate 233. The plate 233 is pivotally mounted on a socket 128 erected on the base plate of the machine. The shift plate 233 has a handle 234, by which the same is manually controlled.

A key plate 235, seen best in Fig. 13 of the drawings, is coincident with the operating position of the lever 177. It will be noted that as the wedge end of the rail 231 is moved under the outer ends of the plates 235 and 227, the escapement plates 204 corresponding thereto are retracted thereby. It will also be noted that as the number of plates 227 acted upon by the rail 231 increases, the space between the releasing station of the tooth 203 and the station of its reëngagement is increased. In the normal operation of the machine the shift plate 233 is set once only. The normal left-hand margin of the printing is thus established; the position of the plate 227 at the right of the wedge end of the rail 231, is not affected by said rail 231. The escapement plate 204 corresponding thereto remains in the path of the tooth 203 when the same is released by the escapement plate 204 coincident with the last letter space of the previous line. This, as previously explained, normally corresponds with the operating position of the lever 177, and the sector 179. Under normal conditions, if the printing on the line fills the full space, said lever 177 is operated to set the line spacing mechanism, and coincidentally or immediately and automatically following, the cylinder 101 is released to rotate until the escapement plate 204 at the right of the wedge end of the rail 231 is engaged by the tooth 203. This, it will be noted, places the cylinder 101 in position to receive the first letter of the printing mechanism on the left-hand margin of the paper printing space.

As best seen in Fig. 11 of the drawings, the tooth 203 is set back from the operating edge of the sector 179. The distance between the face of said tooth and the edge of said sector corresponds with the length of the foot plate 236. As a result of this, the engagement of the lever 177 by the sector 179 corresponds with the release of the tooth 203 by the escapement plate 204 juxtaposed to and on the near side of the plates 24 operated upon by the foot plate 236. If the printing of the last letter of the last syllable results in the release of the said escapement plate adjacent those controlled by the foot plate 236, the succeeding movement of the sector 179 would operate the line-feeding mechanism, part of which operation, as above stated, lifts the long end of the lever 126 and depresses the short end of the said lever, carrying the plate 236. It will be noted that as the lever 126 is rocked to depress the long end thereof, the end carrying the foot plate 236 is lifted, as is shown in Fig. 13 and by dotted lines in Fig. 6. This permits the escapement plates 204, controlled by the said foot plate 236, to be interposed in the path of the tooth 203, to be engaged thereby on escaping from the plate 204 preceding said controlled plates.

When the lever 177 is moved by the sector 179 to retract the thrust bar 169, the arm 153 is permitted to pass under the arm 151. The shaft 161 is subsequently rocked to lift the arms 153 and 151, at the completion of the printing of a syllable. The line shifting mechanism is then operated. A part of this operation, it will be remembered, is the lifting of the lever 126, to the full line position shown in Fig. 6, which depresses the end having the plate 236 on the extensions 230 of the escapement plates 204 controlled by the said foot plate 236. This removes the said escapement plates from the path of the tooth 203 and frees the mechanism for rotating the cylinder 101 until the said tooth 203 engages the escapement plate immediately at the right of the wedge end of the rail 231 or of a key plate 227 adjacent thereto.

The above description relates to what may be termed the normal operation. Where, however, the last syllable to be printed on the line contains letters which if printed on the line being completed would extend beyond the marginal edge, the line-shifting mechanism does not operate until after the completion of the printing of the syllable and after the completion of the rotation of the table 304 to release the shaft 167 from engagement with the wheel 143, which action inaugurates the operation of the line-shifting mechanism. Meanwhile the sector 179 has engaged and operated the lever 177 and parts connected therewith, which lever and parts are held in operative position, awaiting the completion of the operation of the printing mechanism and the completion of the printing of the said syllable. Immediately the printing of the syllable is finished, the line-feeding mechanism operates.

It will be understood that while the drawings and description relating thereto, disclose five escapement plates controlled by the plate 236, the number of escapement plates so controlled may be augmented. The number of controlled plates 204 is optional, being determined only by what practice has proved necessary to their employment.

To release the tooth 203 and sector 179 at any position in one line, and to arrest it at the beginning of the next succeeding line, a key-operated mechanism is provided, which embodies a shiftable ring 237. The ring 237, as best shown in Fig. 13 of the drawings, is split to form a gap 238, through which one of the plates 204 may pass. The ring 237 rests upon the extensions 230 of the plates 204. It is provided with a handle 239, by means of which it can be manually shifted. Said ring slides in loops 240 in rocking bars 241. The bars 241 are pivoted on pins 242 and are operatively depressed by connecting rods 243, to which a bell crank lever 244 is connected. The lever 244 is connected by a rod 245 with a bell crank lever 246. The opposite end of the lever 246 is operatively connected with the stem of a key pad 247. It will be seen that when the pad 247 is manually depressed, the ring 237 is forced down upon the extension 230, with the result that all but one of the escapement plates 204 are removed from the path of the tooth 203. The single plate 204 which is not depressed determines the arrested position of the platen cylinder 101 and the printing position for the next succeeding line. It will be understood that if the key pad 247 is depressed at the end of a short line, the sector 179, in passing to the marginal position determined by the plate 204 which remains in the path of the tooth 203, operates the lever 177 to inaugurate the operation of the line spacing mechanism.

*Printing mechanism.*

The printing mechanism employed in the present invention differs from the conventional mechanism of this character principally in that the manual selection of the characters being printed is performed in groups operated upon simultaneuosly, the individual characters being thereafter printed in proper sequence and automatically. It should also be noted that the printing mechanism in the present machine is in effect a master or controlling mechanism for the line-spacing and letter-spacing mechanisms described in previous sections. Further, it should be preliminarily noted that the release or inauguration of the operation of said line-spacing mechanism occurs at the termination of the automatic operation of the printing of the last group of each line.

In the present machine the printing is primarily effected by means of a wheel 301. The wheel 301 has disposed thereon a number of lines of type characters constructed and arranged to print upon the paper held by the platen cylinder 101. The type characters are properly spaced to avoid overstriking or smudging of the printed matter. In the present drawings three lines or banks of type characters are shown, as seen best in Fig. 3 of the drawings. The present arrangement provides for small type in the upper bank, "capitals" in the middle bank, and figures and miscellaneous characters in the lower bank. It should be understood that this arrangement is subject to a great many variations not necessarily noted herein.

The type wheel 301 is automatically reciprocated to and from the cylinder 101 to strike the same and the paper thereon a sharp and sufficiently positive blow. To this end, the wheel 301 is mounted on a shaft 302, the lower end whereof is stepped in a socket post 303 of a locating table 304, which is best seen in Fig. 29 of the drawings. The locating table 304 is provided with a spindle shaft 305. The shaft 305 is mounted in a socket in the end of a stationary post 306. The upper end of the shaft 302 has a bearing in a swinging arm 307. The arm 307 is provided with a vertical extension 308, the perpendicular offsets formed at the ends of which provide sockets to receive pivot pins 309, as shown best in Fig. 3 of the drawings. When the arm 307 is rocked on the pivot pins 309 the shaft 302 is swung to and from the cylinder 101, said shaft pivoting on its lower end.

The arm 307 is rocked in the manner above described by the cam grooved wheel 143 and the connecting arm 167. The arm 167, it will be remembered, operates the arm 160 to release the line-spacing mechanism when under normal conditions. In the printing mechanism it will be noted, the arm 167 is operatively connected with the arm 307 by means of connecting rods 310 and 311. The rods 310 and 311 are connected by a bell crank lever 312, the arms of which extend over a pivot shaft 313. The wheel 143 is continuously rotated, being power driven. The operations of the various mechanisms hereinbefore described are timed with reference to the driving mechanism and controlled by the operation of the wheel 143, with which they are connected temporarily.

The vibration of the arm 307 is dependent on the introduction of the roller 168 into a cam slot 319. This is primarily effected by rocking the vertical shaft 320. To this end the shaft 320 is provided with a pivoted latch blade 321 and a pull spring 322.

Normally the latch blade 321 is held by the locating table 304 and by a tooth 323 pendent from the edge thereof. The blade 321 is normally lifted into the path of the tooth 323 by a spring 324. The spring 324 is anchored to the blade 321 and to a stop bracket 325, the end of which forms a stop member against which said blade 321 is drawn.

When, in the operation of printing, the key pads of the key table are depressed, the blade 321 is depressed to free the tooth 323 and locating table 304. The spring 322, being unrestrained, rotates the shaft 320 backward to the position shown in Fig. 28 of the drawings.

At the lower end of the shaft 320 a laterally-extending arm 326 is operatively connected with a link bar 327. The link bar 327 is pivotally connected with an arm 328 extended from a short pivot shaft 329. At the lower end of the shaft 329 is a second extended arm 330. The arm 330 is operatively connected by a link bar 332 with an arm 331 laterally extending from the vertical shaft 165. It will be remembered that the shaft 165 is also provided with the arms 164 and 166, and that the latter is operatively connected with the arm 167, at the end whereof is found the roller 168, adapted to be inserted within and withdrawn from the slot 319 of the wheel 143.

The rise and fall of the connecting rod 310 and the rocking of the arm 307 continues at regular intervals, driving the type wheel 301 against the platen cylinder 101 at each rotation of the wheel, until, in the course of its operation, the tooth 323 engages the blade 321 at the completion of the rotation of the locating table 304 to move the blade 321 to the position shown in Fig. 27 of the drawings, where it is shown that when the blade 321 is in the position indicated in said Fig. 27, the roller 168 is withdrawn from the slot 319 in the wheel 143. With the withdrawal of said roller the operation of the type wheel 301 is arrested.

The locating table 304 is rotated by a coil spring 314. The spring 314 is anchored to a rod 315 on a table forming a part of the rewinding mechanism hereinafter described. The table 304 is rotated step by step, the number of steps, as a rule, not exceeding five to the complete revolution. Said locating table is arrested in correspondence with the printing selective mechanism which is manually operated from the key-board.

The points of stoppage of the table 304 are governed by the disposition of the arresting blades 316. The blades 316 are supported by spiral springs 317, which lift said blades upward to pivot on a circular wire 318. The upper ends of the blades 316 extend through slots 333 formed radially in a ring plate 334. The normal operation of the springs 317 rocks the blades 316 to extend the ends of each into the path of a lug 335 extending from the under side of the table 304. This position is shown by dotted lines in Fig. 29 of the drawings. Normally the springs 317 are prevented from thus operating by thrust bars 336, which bars are each provided with a toe 337 to form a knife-edge pivot joint inside of an extension 338 formed at the lower end of each of the blades 316 and at the inner side of the circular cage formed by said blades. From the foregoing it will be seen that if any number of the thrust bars 336 disposed serially, be depressed, the blades 316 corresponding to the depressed bars 336 will be moved by their respective springs 317 into the path of the lug 335. This operation is performed coincident with or slightly in advance of the release by the latch blade 321, of the tooth 323.

The table 304, being released, is rotated by a spring 314 until the lug 335 engages the first of the inset blades 316. Before the table 304 is permitted to travel further, the arresting blade 316 must be removed from the path of the lug 335. This operation is the function of a cradle 339.

The cradle 339 is pivotally mounted by a short shaft 340 on standards 341 set out from the side of the socket post 303, as shown best in Fig. 29 of the drawings. The cradle 339, therefore, becomes a structural part of, to move with, the table 304. There is only one cradle 339. The lower ends of said cradle form bearings for a pivoted shaft 342, upon which is rigidly mounted a kicker bar 343. The kicker bar 343 has an upper end extension, which is rocked against a brace bar 344 by a spring 345. The table 304 is provided with a slot through which the lower end of the kicker bar 343 extends, said slot being elongated to permit the necessary radial movement of said kicker bar. The cradle 339 is normally retracted by a pull spring 346 anchored at one end to the socket post 303 and at the other end to the kicker bar 343.

Normally the cradle 339 is held in the position shown by full lines in Fig. 29 of the drawings by the operation of the spring 346. From this position said cradle is forced to the position shown by dotted lines in said Fig. 29 by a beater lever 347, a ring head 348 of which rests constantly upon a nose 349 formed at the inner end of the cradle 339.

Figure 34:
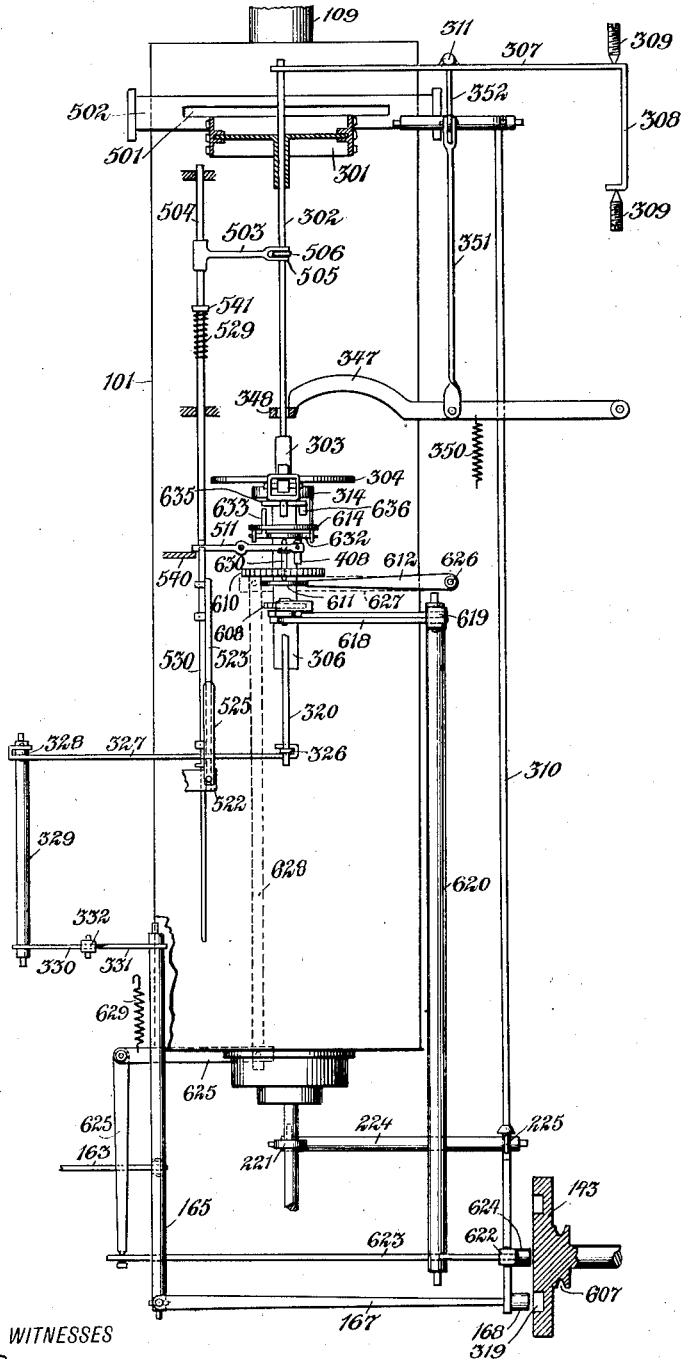
Fig. 34 is a skeleton view showing in elevation the printing platen, printing wheel, and correlated connecting operating mechanisms therefor.

As best shown in Fig. 34 of the drawings, the lever 347 is operated by a pull spring 350, which is suitably anchored to the frame of the machine. In this connection, attention is drawn to the fact that the office of the connecting rod 311 and arm 307 is supplemented by the spring 350, the lever 347 being operatively connected with the connecting rod 311 by a link 351 and a bell crank lever 352, and operates principally to insure the lift of the connecting rod 310 and roller 168 when the latter is drawn from the cam slot 319 of the wheel 143.

Concordant with each rotation of the wheel 143, the type wheel 301 is moved forward against the cylinder 101, and the lever 347 is lifted from engagement with the cradle 339, permitting the spring 346 to remove the kicker bar 343 from in front of the lug 335. This permits the spring 314 to rapidly shift the table 304 until the lug 335 is arrested by the first inset blade 316. The blade 316 which is engaged corresponds with one of the printing characters of the type wheel, which continues its advance and strikes the paper on the cylinder 101 to imprint the same. The completion of the revolution of the wheel 143 retracts the wheel 301 and coincidentally depresses the lever 347, being aided in this action by the spring 350. The ring head 348 now engages the nose 349 of the cradle 339 and moves the kicker bar 343 against the engaging blade 316 to release the lug 335. The spring 314 immediately rotates the table 304 until the kicker bar 343 in front of the lug 335 engages the next inset blade 316 in position to repeat the operation just above described.

It will be understood that after the selected blades are inset, the operating mechanism for the type wheel 301 and the cradle 339 continues, shifting the table 304 step by step and automatically, until the tooth 323 engages the blade 321 to rock the shaft 320 and withdraw the roller 168 from the cam slot 319 in the wheel 143. It will be found that at the completion of the rotation of the wheel 301 and at the time of the arrestation of the same, each and all of the letters of the selective group, whether syllabic in form or otherwise, will have been printed upon the paper held on the cylinder 101. It will also be found that due to the arrangement of the key-board and the correspondence of the wheel 301 therewith, the printing has progressed in proper sequence. That is to say, if the keys representing the letters l, a, s, were simultaneously depressed on the key-board, the printed result on the paper held by the platen cylinder 101 would be "las."

To secure this sequence, the key-board is provided with a plurality of sets of keys representing the complete alphabet, and the operator, knowing the arrangement, selects the letters with reference to the groups of keys. That is to say, in the illustration given, the "l" should be selected from the upper group, and the "a" and the "s" from the lower group.

Corresponding with the arrangement of the key-board, the type wheel 301 has a like number of groups of the complete alphabet, and the groups on the type wheel 301 have the same serial order that the groups of keys on the key-board have. Thus, in the illustration given, the depression of the key indicating "l" on the key-board in the first or upper group thereof permits the insertion of a corresponding arresting blade 316, which will engage the table 304 to locate the same for the printing of the letter "l" by the type wheel. The letter "a" of the second group will follow, the group of letters to which it belongs following the first-mentioned group, although the letter of the alphabet has precedence of the printed letter "l."

Figure 22:
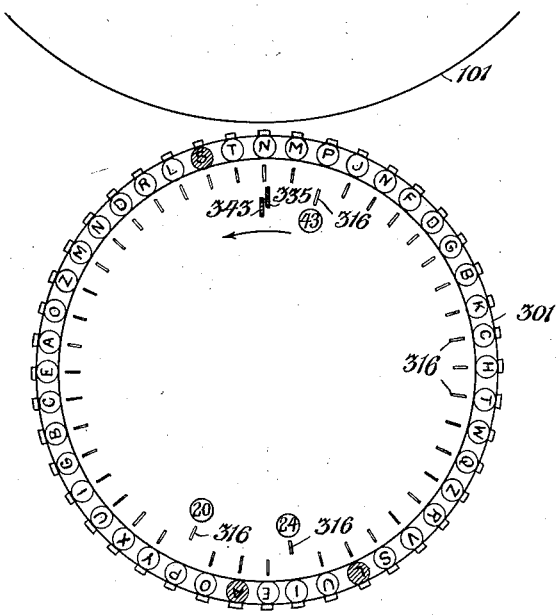
Fig. 22 is a diagrammatic view of a type wheel constructed and arranged in accordance with the present invention, showing in conjunction therewith a fragment of the printing platen, the selective arresters, the stop member for said type wheel, and releasing devices therefor.
Figure 23:
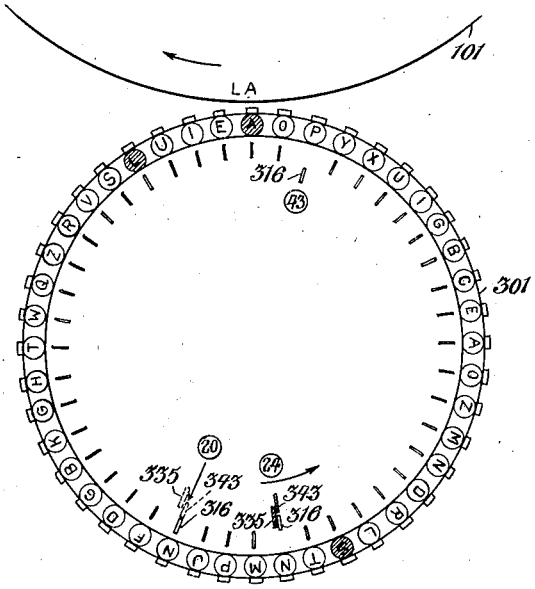
Fig. 23 is a similar view showing the type wheel in arrested position, the arresting and releasing mechanisms being shown in full lines to indicate the arrested position of the type wheel, and in dotted lines to indicate the position assumed by said arresting and releasing mechanisms when releasing said type wheel.

Figs. 21, 22 and 23 are employed to illustrate the method of selecting and arresting the printing wheel in printing position. The syllable used in the illustration is composed of the letters l, a, s. In Fig. 21 of the drawings the keys numbered "20," "24" and "43" in the lower portion of said figure control the arresting blades, whose location in the cage formed by said blades is indicated in the upper portion of said figure by similar numerals "20," "24" and "43." To more readily distinguish these numbers and locations, the drawing has been tinted where the numbers occur. The same is true of Figs. 22 and 23. In Figs. 22 and 23 the tinted circles are marked with letters and the figures above mentioned to indicate the printing characters. Within each of the circles shown in said Figs. 22 and 23 are represented the blades 316 and also the lug 335 and the kicker bar 343. In Fig. 22, the tinted circles marked "20," "24" and "43" correspond with the similarly marked circles in Fig. 21, and show that the blades 316 to which they belong are inset in the path of the lug 335. Fig. 22 is further used to illustrate what may be termed the starting position of the type wheel 301. The arrow is used to indicate the direction of travel of the locating table 304 and of the lug 335 mounted thereon. The table is released immediately the blades 316 are set. This being so, it will be noted that the first point of arrestation of said table and of the type wheel 301 connected therewith, will be at the station marked "20," where the blade 316 is set. When the table 304 is arrested in this position, it will be found that the type character "l" on the wheel 301 is in printing position. The table 304 and type wheel 301 are thus held until the beater lever 347 operates to rock the cradle 339. Rocking the cradle 339 moves the kicker bar 343, as shown in dotted lines in Fig. 23 of the drawings, to reset the blade 316 and move it from the path of the lug 335 immediately the table 304 and the type wheel connected therewith move to the next station, which in Figs. 22 and 23 is indicated by the circle marked "24."

In Fig. 23 of the drawings, in full lines, there is indicated an arrangement where the lug 335 is engaged by the inset blade 316 which controls the printing position of the wheel 301, to present the letter "a" to the platen cylinder 101. In full lines also, there is shown the kicker bar 343 withdrawn and in line with the blade 316, in position to move the same outward from the path of the lug 335. Consequent upon the operation of the beater lever 347 a second time, the lug 335 will be released by the blade 316 at the station "24" to permit the table 304 to rotate until the lug 335 is engaged by the blade 316 at the station marked "43." When now the wheel 301 is moved against the cylinder 101, the final letter of the syllable "las" is printed, and consequent upon the operation of the beater lever 347, the lug 335 and table 304 are released to return to the initial position of said lug, as shown in Fig. 22 of the drawings. In this position the table 304 is held by the latch blade 321, which, having been engaged by the tooth 323, is moved to the position shown in Fig. 27 of the drawings, where the roller 168 is withdrawn from engagement with the cam wheel 143. Here the table 304 is held until the blade 321 is drawn from engagement with the tooth 323 by a latch head 401.

Figure 20:
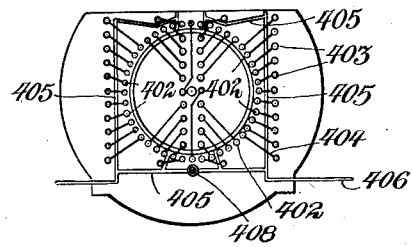
Fig. 20 is a top view of the type printing selective mechanism, said view showing in particular the nested arrangement of the controls of the arresting members.
Figure 19:
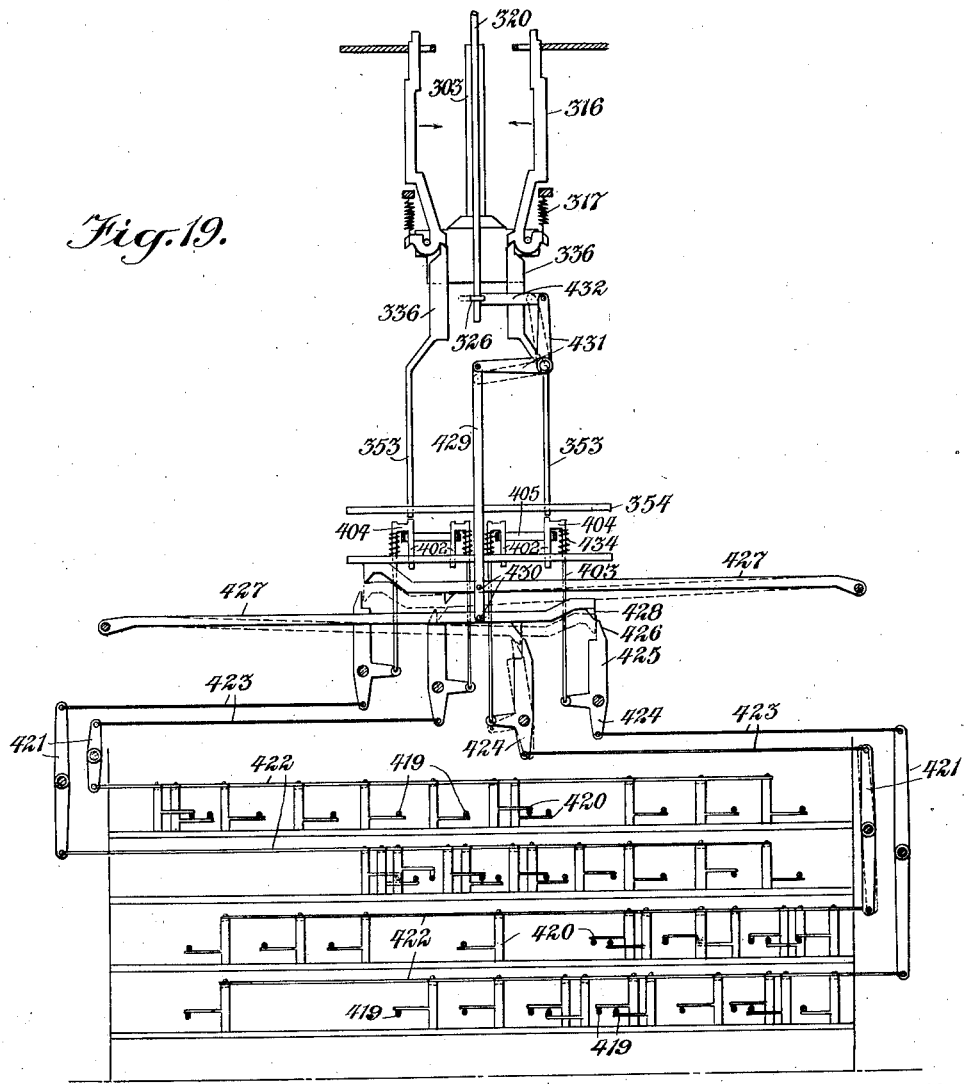
Fig. 19 is a skeleton view showing portions of the printing actuating mechanism.

It has been explained that the normal operation of the springs 317 moves the blades 316 to their inset position in the path of the lug 335. This action is restrained by the thrust bars 336. As best shown in Fig. 19 of the drawings, each thrust bar 336 has a spindle rod 353, the lower end of which extends through perforations formed in a guide plate 354. These perforations are disposed in a circular path to rest above elevators 402, which, as shown in Fig. 20 of the drawings, are disposed in circular arrangement. These elevators 402 normally support in elevated position the thrust bars 336, to rock the blades 316 outward from the path of the lug 335.

As seen best in Fig. 6 of the drawings, the escapement plates 204 and operating mechanism therefor, inclusive of the rewinding mechanism for the spring 111, are supported in a cylinder 355, the base plate 661 of which is provided with a ratchet-toothed flange 356. To engage the teeth of the flange 356 is a blunt-toothed pawl 357. The pawl 357 is constructed to release the teeth of the flange 356, if forced thereto when the operator desires to rotate the cylinder 101.

To rotate the cylinder 101, the shafts 109 and 110 and the cylinder 355, a pintle shaft 358 is extended from the base plate 661 to rest within a socket 128.

It will be remembered that during the operation of printing, the arm 202 is advanced step by step by the removal of the escapement plates 204. If through inadvertence or mistake, a letter has been incorrectly printed, it is possible to turn back the cylinder 101 and parts connected therewith until the space on the cylinder or paper mounted thereon is disposed in printing position. Correction can then be made by printing the correct character after having removed the imprint of the character incorrectly produced, and the cylinder be then returned to the position from which it was moved. The cylinder 355 moving with the cylinder 101, the respective relations of said cylinders and the operating mechanism therefor are unaltered from what they were prior to being shifted for the alteration referred to.

Operating mechanism.

The manual operation of the present mechanism effects the setting of the blades 316 and releases the automatic mechanism described in the preceding divisions. Each of the elevators 402 above referred to is provided with a pull rod 403, with which it is connected by a bridge piece 404. The bridge pieces 404 are provided to straddle frame members 405 of a rocking frame 406, as best shown in Fig. 20 of the drawings. As seen in Figs. 1 and 2 of the drawings, this frame is pivoted at the rear of the machine on pivot pins 407. The frame 406 is operatively connected with the latch head 401 by a connecting rod 408, as best seen in Fig. 1 of the drawings. The rod 408 supports the latch head 401, providing a housing therefor, in which said latch head is pivoted by means of a pivot pin 409, as best seen in Fig. 26 of the drawings. The latch head 401 is held in its active position by a spring 410. The spring 410 holds a tail piece 411 of said latch head against a stop 412. When the tail piece 411 bears against the stop 412 the latch head 401 is in active position. The head 401 is disposed in advance of and engaged by a blade 321 when said blade is engaged by the tooth 323. To pass said blade when the rod 408 is permitted to rise, the latch head 401 is furnished with a straight abutment surface 413, which, moving over the edge of the blade 321, passes above the same until a notch 414 of the latch head 401 engages the blade 321. The spring 410 immediately moves the latch head 401 to engage the blade 321. This action occurs when the frame 406 is released by a locking mechanism hereinafter set forth, which occurs at the completion of rotation of the wheel 301.

Each of the elevators 402 and pull rods 403 connected therewith are operatively connected with one of the key pads 415. The pads 415 are each supported on stems 416 by means of rocking guide links 417, as best seen in Fig. 1 of the drawings. The stems 416 are each operatively connected with one or more bell crank levers 418, which levers are also connected by means of thrust rods 419, as best seen in Figs. 1 and 19 of the drawings, with a connecting bell crank lever 420. Each bell crank lever 420 is operatively connected with a rocking beam 421 by means of a connecting rod 422. The other end of each beam 421 is connected by means of a rod 423 with a bell crank lever 424 operatively connected with a pull rod 403 of one of the elevators 402. The arrangement of this connective mechanism is such that when any pad 415 is depressed, one of the elevators 402 is correspondingly depressed to permit the thrust bar 336 to fall from the path of one of the arresting blades 316. Each pad 415 being independently connected with one of the blades 316, it is obvious that any number of pads may be depressed simultaneously to set a corresponding number of blades 316.

As shown best in Figs. 1 and 19 of the drawings, the rocking beams 421 are arranged in groups vertically disposed. Preferably these groups are four in number and disposed in parallel arrangement. Further, a corresponding arrangement of the bell crank levers 424 is provided. It is to accommodate this arrangement of the levers 424 and the pull rods 403 connected therewith, combined with the necessity of connecting said pull rods with the elevators 402 disposed in circular arrangement, that I vary the arrangement and length of the bridge pieces 404 connecting said pull rods and elevators, as seen best in Fig. 20 of the drawings.

Each of the bell crank levers 424 is provided with a vertical extension 425. The upper ends of each of the extensions have a notch 426 formed therein to constitute a locking member for the bell crank levers which are at the time actively disposed. The bell crank levers 424 and the extensions 425 thereof are arranged in four groups, said groups being preferably arranged in pairs, and the members of said pairs being disposed so that the notches 426 open from or face in opposite directions. To engage the notches 426, the rectangular frame 427 is provided with cross braces 428, which braces are wedge-shaped or inclined backward from a vertical face adapted to rest in the notches 426 to prevent the forward rocking of the extensions 425 or movement of the bell crank levers 424, which would result in a pull upon the rods 403 and consequent lowering of the elevators 402, until the wheel 301 has completed its rotation each time the operator strikes one or more of the pads 415.

The locking mechanism above referred to is operatively connected with the shaft 320, which, as above described, is rotated by the pull of the spring 322 when the latch blade 321 is released. It will also be remembered that the release of said latch blade 321 is effected by the depression of the connecting rod 408 and the latch head 401 mounted thereon. Further, it will be seen that the frame 406 with which the rod 408 is connected, is operated by the depression of any one or more of the elevators 402. Consequently, though nearly related in point of time, the release of the latch blade 321 is actually subsequent to the rocking of the bell crank levers 424 and the depression of the elevators 402, connected therewith. Therefore, when the shaft 320 rocks to depress the frames 427, the elevators 402 operatively connected with the selected key pads 415 which have been depressed, have been actively disposed, and the inclined backs of the extensions 425 have passed to the inner or inclined sides of the various braces 428. The lowering of said braces and the frames 427 connected therewith now prevents the withdrawal from the active position of the bell crank levers which have been operated upon.

The mechanism connecting said frames 427 and the shaft 320 is best shown in Fig. 3 of the drawings, where it will be seen that a connecting rod 429 is connected by pivots 430 with both of the frames 427. The rod 429 is pivotally connected with one arm of a bell crank lever 431. The opposite arm of said bell crank lever is pivotally connected with a short link bar 432. It will be seen that when the shaft 320 is rotated, the link bar 432 is moved in the direction of the arrow to rock a bell crank lever 433, to depress the connecting rod 429 and the frames 427. It is obvious that when, as above described, the table 304 has completed the rotation, and the tooth 323 thereon has engaged and reset the latch blade 321, this operation rocks the shaft 320 in the reverse direction, with the result that the connecting rod 429 and frames 427 are lifted, thereby permitting the spring 434 to lift the depressed elevators 402 and thrust bars 336 connected therewith, and to rock the previously set bell crank levers 424 to the inactive position thereof.

*Printing position controlling mechanism.*

It has been shown how the type wheel 301 is controlled and operated to successively imprint the letters of a manually-selected group. The type wheel, as shown best in Figs. 3 and 34 of the drawings, is furnished with three separated sets of characters, the upper set being small or body printing letters, the intermediate set being capitals, and the lower set figures and miscellaneous characters. The present machine provides for what is known in the art as "visible writing". With this object in view, the wheel 301, as is best shown in Fig. 31 of the drawings, is normally disposed below the line of printing and below the gap 501 in the thin shield 502 which is interposed between the paper on the platen cylinder 101 and the face of the type wheel 301. In this way provision is made for printing from only one of the set of printing characters with which the wheel 301 is provided. The above-stated arrangement of the wheel 301 necessitates that said wheel be raised for each operation thereof, or for each series of operations incident to each rotation of said wheel.

The shaft 302 on which the wheel 301 is mounted is supported by an arm 503 set out from a shift bar 504. The end of the arm 503 has a yoke 505, the sides of which infold a collar 506 integrally or rigidly mounted on the shaft 302. The shaft 302 is freely mounted in the end of the arm 307, and, as best shown in Fig. 29 of the drawings, is provided at the lower end thereof with an extension 507 to form a sliding engagement with a post 508 which is mounted on the locating table 304. The post 303 of said locating table is provided with a slot 509, in which said extension 507 moves when the shaft 302 is elevated or depressed.

The shaft 302 and wheel 301 thereon are elevated coincident with the depression of the connecting rod 408 and latch head 401, which, as stated, releases the latch blade 321 to permit the type wheel 301 to rotate. As best shown in Fig. 33 of the drawings, the connecting rod 408 is pivotally connected by means of a pin 510 with a yoke-ended rocking lever 511. The opposite end of the lever 511 normally rests upon a portion of the frame of the machine and beneath a foot 512 of the shift bar 504. The lift of the arm 511 equals the distance below the gap 501 at which the upper line of printing characters normally rest. Therefore, as the latch blade 321 is released, the shift bar 504, shaft 302 and type wheel 301 are elevated to place the upper line of type in alinement with the printing position on the cylinder 101, or opposite the gap 501 in the shield 502. It will be remembered that the frame 406 to which the connecting rod 408 is attached is held down by the locking frames 427 until the shaft 320 is reset to its original position at the completion of the rotation of the table 304 and of the wheel 301. Therefore, during the automatic printing above described, the wheel 301 is maintained in its active or operative position.

If it is desired to shift the printing wheel 301 from its normal position or from its position shown in Fig. 31 of the drawings, the shaft 513, shown best in Fig. 2 of the drawings, is rocked by depressing the end having the key pad 514. As shown best in Fig. 31 of the drawings, the key pad 514 is at one end of the rocking lever 515, while at the opposite end is a key pad 516, which is used to shift the type wheel 301 to aline with the lower line of type characters formed thereon. Usually, the lower line has printing characters for the imprinting of numerals and miscellaneous printing characters.

The lever 515 is provided with cam arms 517 and 518 of different lengths. The cam arms 517 and 518 are disposed above, to engage the free end of a rocking lever 519, which has a pivot 520, seen best in Fig. 31 of the drawings. Pivotally connected with the opposite end of the lever 519 is a supporting frame 521. The frame 521 has a bracket extension 522, on which is pivotally mounted a rocking member 523. The member 523 has a head 524. Said member 523 is moved by a flat spring 525 toward the frame 521. The member 523 is also provided adjacent the lower end thereof with a cam 526 to engage an offset 527 on the frame of the machine when the frame 521 is in its lowered position, as shown in Fig. 31 of the drawings.

From the foregoing, it is obvious that if the cam arm 517 is properly constructed, the rocking of the lever 515 by depressing the end thereof having the key pad 514, will lift the frame 521 and the rocking member 523 mounted thereon. The lift of the member 523 relative to the offset 527 carries the cam 526 out of engagement with the offset 527, as shown best in Fig. 32 of the drawings.

Slidably mounted within clips 529 on the member 523 is a stepped, gage-headed slide 530. The slide 530 is shaped as best seen in Fig. 31 of the drawings. The notches with which the slide 530 is provided are adapted to override the lever 511 if the shift bar 504 has been lifted from said lever by the operation of frame 521. When the outer extension of the slide 530 passes above said lever, it will be found that the shaft 302 and the wheel 301 have been lifted to a position where the normal lift of the lever 511 incident to the operation of the connecting rod 408 will further lift the shift bar 504 to present the second line of type on the wheel 301 in printing position opposite the gap 501 in the shield 502.

It will be seen that if the lever 515 is rocked by the depression of the end thereof having the key pad 516, the lift of the frame 521 is augmented until the slide 530 interposes the second notch of the gage head thereof between the lever 511 and the foot 512 of the shift bar 504.

It will be understood that the general plan of operating the machine is the same with reference to the elevated position of the shaft 302 whether the printing be performed by the upper, intermediate or lower line of the type characters on the wheel 301. When, however, the frame 521 is lowered from an elevated position, a trip member 531 engages, by means of teeth 532, an extension 533 on a trigger 534, which is mounted on the side of the frame 521. The trigger 534 has a finger 535, which normally rests against a stop 536 and thrusts against the head 524 on the rocking member 523 when the extension 533 is engaged by the trip member 531. The trigger 534 is normally held back from engaging the head 524 by a flat spring 537. The trip member 531 is also held in its alert position by a flat spring 538.

The shift bar 504 is normally pressed upon the free end of the lever 511 by a spring 539. To normally support the free end of the lever 511 I provide a bracket 540, as shown best in Figs. 31, 32 and 33 of the drawings. To equalize the pressure of the spring 539 in all of the positions to which the shift bar 504 is adjusted, said spring rests against a bracket 541 set out from the side of a guide bar 542. The guide bar 542, as well as the heel of the foot 512, rests upon the frame 521. The guide bar 542 is held upon the frame 541 and serves to depress the same by means of a coil spring 543.

It will be seen that when thus constructed, if the frame 521 is lifted, the guide bar 542 and the shift bar 504 are lifted, maintaining constant in all positions the yielding moment of the spring 539.

The sliding construction of the slide 530 permits its extension on the member 523 when at the proper moment the lever 511 is operated. It will be appreciated that when, in the course of operation, the lever 111 is permitted to return to its normal position at rest on the bracket 540, the springs 539 and 543 press downward the frame 521, causing the extension 533 of the trigger 534 to rotate said trigger toward the head 524 of the member 523, thus withdrawing the links of the head 530 from the lever 511 and the foot 512. At this moment the head 530 remains somewhat behind the frame 521, moving through the clip 529 of the member 523, but the pressure of the upper spring 539 returns it to its normal position.

In Fig. 34 of the drawings is shown a shield 502. The shield used at present by me is constructed of thin dentist's rubber in which is cut or otherwise formed the slot or gap 501. Said shield is suitably supported. In Fig. 2 of the drawings an inking wheel 544 is shown, by means of which ink is fed to the type wheel 301. Both of these accessories may be replaced by any suitable conventional device.

Power driving mechanism.

The present machine is what may be termed a "power-driven" machine as contradistinguished from a "manually-actuated" machine. As seen best in Fig. 2 of the drawings, the prime mover 601 has a driving gear wheel 602, which operatively engages a small pinion 603 on the driving shaft 604 of a cam wheel 143. The wheel 143 is operatively connected by a belt 606, with a relatively small pulley 607 concentric with and rigidly mounted upon the cam grooved wheel 143. The prime mover 601 is continuously operated, thereby insuring the continuous rotation of the wheels 143 and 605.

Two of the functions of the wheel 143 and of the slot 319 have been set forth. A third function is performed by said wheel and slot, to wit, the rewinding of the spring 314 to compensate for the loss therein for each rotation of the table 304.

With this end in view, a small ratchet wheel 608 is fixedly mounted on a sleeve 609 rotatively mounted on the post 306, as best seen in Fig. 29 of the drawings. Similarly mounted on the sleeve 609 is a large ratchet wheel 610. Between the two ratchet wheels is disposed the ringed end 611 of a rocking arm 612. As best seen in Fig. 1 of the drawings, the ratchet wheel 610 is held against rotation in one direction by a pawl 613 to hold the winding position of the sleeve 609. The sleeve 609 has rigidly mounted thereon a laterally-extending disk 614, to which the rod 315 is fixedly attached. The free end of the spring 314, it will be remembered, is anchored to the rod 315; hence, when the sleeve 609 is rotated the spring 314 is wound, the sleeve 609 being held in advanced position by the pawl 613 and the ratchet wheel 610.

Figure 16:
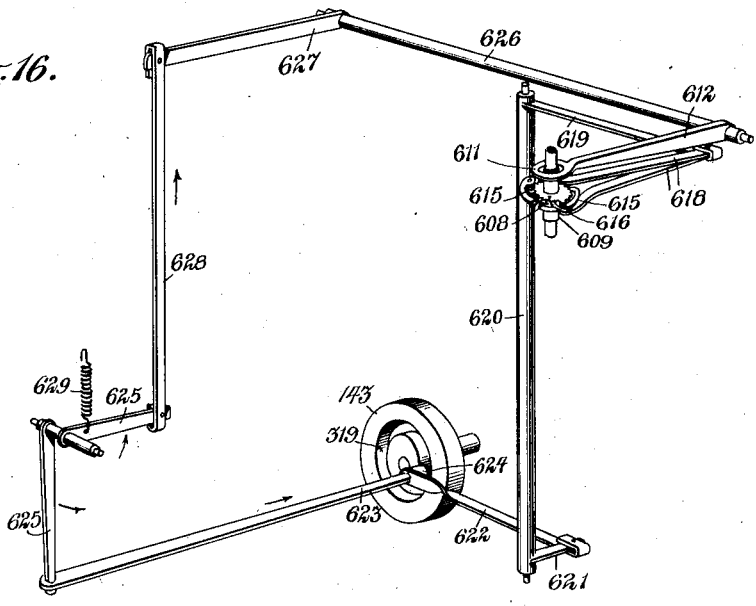
Fig. 16 is a detail view in perspective of an actuating mechanism for the type ring letter-spacing mechanism.

The ratchet wheel 608 is operatively engaged by the oppositely-disposed pawls 615. This construction is best shown in Figs. 16, and 38 of the drawings. The pawls 615 are pivotally mounted at the ends of lugs 616 on collars 617, which collars are pivotally mounted on the post 306 below the ratchet wheel 608. The lugs 616 are also connected by links 618 with a rocking arm 619. The arm 619 is rigidly connected with a pivot shaft 620, the lower end whereof is extended to the level of the wheel 143, as best seen in Fig. 16 of the drawings, and is there provided with a lateral arm 621. The arm 621 is operatively connected by a link 622 with a rocking arm 623. At the end of the arm 623 a roller 624 is adapted to extend within the slot 319. The relative arrangement of the rollers 624 and 168 is best shown in Fig. 34 of the drawings.

When, in the operation of the machine, the table 304 is released to rotate the type wheel 301, the arm 623 is moved toward the wheel 143, and the roller 624 is inserted in the slot 319 thereof. The arm 623 is pivotally mounted at the lower end of a bell crank lever 625, as seen best in Fig. 16 of the drawings, to be rocked by the cam slot in the wheel 143. The link 622 is reciprocated to rock the shaft 620 and the arm 619 connected therewith. The arm 619 produces a reciprocatory movement in the links 618, which rotate in opposite directions the collars 617. The pawls 615 being oppositely engaged with the wheel 608, the sleeve 609 and parts connected therewith are constantly rotated in a direction to wind the spring 314 with which the disk 614 is connected by the rod 315. When, at the completion of the rotation of the wheel 301 and table 304, the arm 623 is retracted and the roller 624 withdrawn from engagement with the wheel 143, the operation of winding the spring 314 is suspended.

The releasing mechanism above referred to embodies the ringed end 611 and the arm 612. The arm 612, as seen best in Fig. 16 of the drawings, is rigidly connected with a pivot shaft 626. The shaft 626 has at the opposite end an arm 627, which is operatively connected by a link rod 628 with the one of the arms of the bell crank lever with which the arm 623 is also connected. The bell crank lever 625 is operatively engaged by a pull spring 629, the normal operation of which is to move the lever 625 in such manner as to introduce the roller 624 within the slot 319, and to lift the arms 627 and 612 and the ringed end 611 connected therewith. This effort of the spring 629 is normally offset by a pin 630, which is guidedly mounted in the ratchet wheel 610 and in a lug 631 extending from the side of the sleeve 609. The pin 630 is free to slide vertically. As shown best in Fig. 30 of the drawings, the pin 630 rests under a pallet member 632. The pallet member 632 has a vertical extension 633 and is pivotally mounted in lugs 634 pendent from the under side of the disk 614.

As shown best in Fig. 29 of the drawings, the spindle shaft 305 has laterally extended therefrom a disk 635, from the under side of which extends a lug 636. The lug 636 engages the extension 633 of the pallet member 632, when, in the rotation of the shaft 305 and table 304 connected therewith, said lug is moved over said extension. For the lug 636 to move over the extension 633, the pallet member 632 and pin 630 operatively engaging the same are depressed. When so depressed, the ringed end 611 is depressed, and the arm 612 is rocked, as indicated in dotted lines in Fig. 30 of the drawings. By referring to Fig. 16 it will be found that by rocking the arm 612 in the manner indicated, the bell crank lever 625 is rocked to withdraw the roller 624 from the cam slot 319. As stated, the withdrawal of the roller 624 results in the suspension of the winding operation of the sleeve 609 and spring 314 operatively connected therewith. The table 304, in its rotation, is arrested by the blade 321, with the lug 636 engaging the extension 633 to depress the pin 630 and to hold the winding mechanism for the spring 314 inactively disposed.

From the foregoing it will be seen that the driving mechanism for automatically rotating the type wheel 301 is compensated for each operation or for each rotation of said wheel. It will be understood that the amount of rotation imparted to the sleeve 609 is arranged to exactly compensate for the expansion of the spring 314. A similar mechanism to compensate for the rotation of the cylinder 101 is provided, which mechanism will now be described.

The wheel 605 has an eccentric groove 637. The groove 637 is provided to receive a roller 638. This construction is best shown in Figs. 17 and 18 of the drawings. The roller 638 is rotatively mounted on an arm 639, which is advanced toward and retracted from the wheel 605 by a bell crank lever 640, with the free end of one arm of which the arm 639 is pivotally connected.

The arm 639 is also pivotally connected with a rocking arm 641, which is rigidly mounted on a pivot shaft 642. The shaft 642 is provided with bracket arms 643, between which and pivotally supported at the ends of which is a ring 644.

The ring 644 is integrally connected with long suspension rails 645. The rails 645 are provided adjacent the ends thereof with upright sections 646. Said upright sections are united by a pivot shaft 647. Resting on the edge of the ring 644 is the nose 648 of a bent lever 649. The lever 649 is pivotally mounted on a pivot shaft 650 extended from the bottom flange of the casing supporting the escapement plates 204.

A raised end of the bent lever 649 is operatively connected with a collar 651, upon which is pivotally mounted a pawl 652. The tooth of the pawl 652 is engaged with a ratchet wheel 653 rigidly mounted on a sleeve 654, as shown best in Fig. 6 of the drawings. The sleeve 654 is pivotally mounted on the socket post 114 in which the shaft 110 is stepped.

The sleeve 654 has at the upper end thereof the ratchet wheel 113 above described. As seen best in Fig. 8 of the drawings, the ratchet wheel 113 is normally held against backward rotation by pawls 655, said pawls being mounted on the flange ring 205. The spring 111, as best seen in Fig. 10 of the drawings, is anchored by means of the pin 112 to the ratchet wheel 113. The inner end of said spring is fixedly attached to the shaft 110 and operates to rotate the platen cylinder 101 relative to said ratchet wheel and parts connected therewith. When thus arranged, it will be seen that when the wheel 605 is driven, with the roller 638 in the groove 637, the shaft 642 is rocked to rapidly raise and lower the ring 644. The bent lever 649 is rocked in harmony with the movement of the ring 644 and rocks the collar 651 and rotates the wheel 653 and sleeve 654 connected therewith. Rotating the sleeve 654 winds the spring 111 during the rotation of the cylinder 101.

To suspend the winding action of the spring 111, the sector 179 is provided with a lug 656, the office of which is to engage an arm suspended above a rocking pallet member 657. The pallet member 657 rests upon a pin 658, which pin, as seen best in Fig. 6 of the drawings, rests on the ring end of a rocking arm 659. The rocking arm 659 is pivotally mounted upon standards 660 erected on the base plate 661 which supports the cylinder having the flange ring 205. The ring end of the rocking arm 659 rests upon a thrust rod 662, the end whereof rests on a ring 663 concentric with the ring 644 and integrally formed with suspension rails 664, as seen best in Figs. 17 and 18 of the drawings. The rails 664 are connected by pivot shafts 665 at the forward or front end of the key-board, as best seen in Figs. 1 and 18 of the drawings. The ring 663 is supported by short arms 666, which are fixedly mounted upon and extended from a pivot shaft 667. The shaft 667 has a vertical extension 668, which is pivotally connected by a link 669 with the bell crank lever 640. The bell crank lever 640 has a vertically-disposed pivot shaft 670, and is rocked by a pull spring 671 toward the cam grooved wheel 605.

From the foregoing it will be seen that when at the completion of the rotation of the sector 179 the lug 656 rocks the pallet member 657, the rod 662 is forced downward to rock the shaft 667 on the bell crank lever 640 until the roller 638 is drawn out of the groove 637. As in the mechanism controlling the winding of the spring 314, so in the present mechanism for winding the spring 111, the operation is suspended when the type wheel 301 on the one hand and the cylinder 101 on the other hand are at rest. In both mechanisms the inauguration of operation of the type wheel and platen cylinder operates to re-inaugurate the spring-winding mechanisms.

*Operation.*

When constructed and arranged as above described and as shown in the accompanying drawings, the operation of the machine is inaugurated by the manual depression by the operator, of the key pads 415. Said pads are manipulated in groups, care being exercised that where letters of higher power precede letters of a lower power, the former are selected from a group preceding that from which the latter is selected. By the expression of "higher power" as here used, is meant the position which the letter has in the alphabet, as, for instance, the power of "a" is one, and the power of "l" is twelve. In the illustration above given in the division entitled "Printing mechanism" the syllable "las" has been selected. When the operator has this syllable he would select on the key-board the pad having the letter "l," to be found on the third line of the keyboard and in the upper group of pads. The second pad selected would be that having "a" and found in the line below that having the "l" previously selected. The third pad would be that having the letter "s" and found at the bottom of the key-board. For convenience in following this description, these pads have in the drawings been tinted or lightly shaded. It will be also noticed that in groups where the letters composing the same follow in natural order, the same may be selected, if convenient, from the same bank or part of the keyboard.

The groups of pads indicating the letters 1, a, s having been depressed, the bell crank levers 424 connected therewith are rocked to lower the elevators 402 and the thrust bars 336 connected therewith. Simultaneously with the lowering of the elevators 402, the frame 406 is depressed, which lowers the latch head 401 and removes the latch blade 321 from engagement with the tooth 323. The spring 314 immediately rotates the table 304 and type wheel 301 until the lug 335 of said table engages the first of the inset arresting blades 316. The table 304 is held by the engaged blade 316 until, by the operation of the lever 347, the cradle 339 is rocked, and the kicker bar 343 moves the arresting blade out of the path of the lug 335. The spring 314 being under tension, the table 304 is immediately shifted until arrested by the second blade 316 engaging the lug 335. From this second engagement the table is again released by the operation of the cradle 339 to permit the spring 314 to move said table and type wheel connected therewith to the third printing position. This operation continues until the tooth 323 engages the blade 321 and rotates the shaft 320. The rotation of the shaft 320, as above described, withdraws the roller 168 from the slot 319 in the wheel 143, arresting in this manner the operation of the beater lever 347 which actuates the cradle 339.

Simultaneously and in correspondence with the release of the table 304 and printing wheel 301 by the operation of the beater lever 347, the platen cylinder 101 is shifted for letter spacing by the operation of the kicker bar 215 and cradle 210, which removes each of the escapement blades 204 from the path of the arm 202 on the sector 179. This permits the spring 111 to step by step rotate the shaft 110 and cylinder 101 mounted thereon.

As each word is finished, the operator, as in conventional forms of typewriters, depresses the space bar 435. The bar 435 rocks the frame 436 pivoted on the shaft 437, and rocks the frame 439 pivoted on the bearings 440, and lifts and depresses a vertical bar carried at its upper end by the connecting arm 441. Said arm 441 rides on the horizontal arm 225 lifted by the spring 226. The end of the arm 225 is beneath a washer integral with the vertical rod 310. Said arm 225 is merely in contact with said washer, mentioned in the printing mechanism section, and is removed from it when pressed down by the arm 441 when the space bar 435 is struck. The arm 225 and lever 223 are rigidly mounted on the shaft 224, best shown in Fig. 3. The lever 223 is provided at its end with a ring 221, having permanent contact with the nub 222 of the cradle 210, as shown in Fig. 10 of the drawings. The depression of the ring 221 produces a rotative step of the shaft 110 and of the platen connected therewith.

At the end of the line of printing, the sector 179 automatically releases the line-spacing mechanism above described, permitting the lift of the cylinder 101 a single line space. Coincident with the lift of the cylinder 101 the spring 111 is permitted to continue the rotation of the sector 179 and cylinder 101 until arrested by one of the escapement plates 204. The location of the initial plate 204 is manually predetermined by shifting the wedge-ended rail 231, the operator employing for this purpose the handle 234. Indenting where desired to show a paragraph is accomplished in the present machine in a manner similar to that employed in conventional machines, to wit, by releasing the printing mechanism and letter-spacing mechanism in the manner above described, advancing rotatively the cylinder a desired number of letter spaces. If desired, this may also be accomplished by moving the rail 231 forward the desired number of spaces which it is the purpose of the operator to indent the paragraph. This having been effected, the rail 231 may be returned to the normal left-hand margin line.

In the previous description it has been set forth how, if the operator desires to print a capital letter, numeral, or other character, this is accomplished by depressing the pad 514 or 516, with the resulting lift of the printing wheel 301.

If, at the end of a short line, the operator desires to shift the printing position to the next succeeding line and to the initial letter-printing position thereon, this is done by pressing the pad 247, which, operating through the ring 237, removes all but one of the escapement plates 204, this one being coincident with the initial letter-printing position of the cylinder 101 and type wheel 301.

If, for any reason, the cylinder 101 is to be rotated independently of the feeding mechanisms, this may be accomplished by rotating the cylinder at will, the pawl 357 yielding to permit the movement of the base plate 661. Also, it will be understood that the cylinder 101 may be freely lifted or depressed, the operator manipulating the handle member 186 to lift the fender bar 190 and thereby disengage the pawls 120 and 183, freeing the cylinder and controls and the line-spacing mechanism thereof.

At the completion of the operation, the supply of power to the prime mover 601 is discontinued, and the machine is at rest.

Claims:

1. A machine as characterized, comprising a vertically-disposed, cylindrical, rotary platen; power-driven means for rotating the same in one continuous direction; power-driven means for elevating said platen between the normal margins of the printing space; and means for suspending the operation of said means for elevating said platen in correspondence with an operation of the printing mechanism begun before and continued after the normal right hand margin of the printing space is reached.

2. A machine as characterized, comprising a rotary, cylindrical platen; a ratchet-toothed supporting bar therefor, said bar having axially-alined, bearing collars for maintaining the operative position of said platen; an elevating mechanism, embodying a pawl movable to progressively engage the ratchet teeth on said supporting bar; a detent for holding said bar and platen mounted thereon in each elevated position thereof; a power mechanism operable to progressively move said pawl to a succeeding operating position at the beginning of the printing of a line; and means for holding said power mechanism in suspension until the printing of said line is finished.

3. A machine as characterized, comprising a rotary, cylindrical platen; a ratchet-toothed supporting bar therefor, said bar having axially-alined, bearing collars for maintaining the operative position of said platen; an elevating mechanism, embodying a pawl movable to progressively engage the ratchet teeth on said supporting bar; a detent for holding said bar and platen mounted thereon in each elevated position thereof; a power mechanism operable to progressively move said pawl to a succeeding operating position at the beginning of the printing of a line; means for holding said power mechanism in suspension until the printing of said line is finished, and means, operable by said platen, for releasing said power mechanism to elevate said platen.

4. A machine as characterized, comprising a printing wheel; a power reciprocating mechanism therefor; a locating mechanism, embodying a table having a stop member; a plurality of arresting blades pivotally mounted in concentric relation to said table, the ends of said blades being normally held parallel with and out of the path of said stop member; means, manually selective, for disposing said blades in the path of said stop member; a driving mechanism for rotating said table and wheel connected therewith until arrested by said blades; means for automatically removing said blades successively from the path of said stop member; and an independent motor for rotating said wheel.

5. A machine as characterized, comprising a printing wheel; a power reciprocating mechanism therefor; a locating mechanism, embodying a table having a stop member; a plurality of arresting blades pivotally mounted in concentric relation to said table, the ends of said blades being normally held parallel with and out of the path of said stop member; means, manually selective, for disposing said blades in the path of said stop member; a driving mechanism for rotating said table and wheel connected therewith until arrested by said blades; means for automatically removing said blades successively from the path of said stop member; an independent motor for revolving said printing wheel; a power-operating mechanism for reciprocating said wheel; and means connecting said power operating mechanism and said independent motor, for compensatingly reënergizing said motor.

6. A machine as characterized, comprising a rotary, cylindrical platen; a rotary printing type wheel; a power mechanism for reciprocating said type wheel to impinge upon said platen; independent auxiliary motors, one for said type wheel and one for said platen; and transmission mechanisms for said power mechanism and said auxiliary motors, for energizing said auxiliary motors.

7. A machine as characterized, comprising a vertically-disposed, cylindrical, rotary platen; means for holding paper thereon in an upright position; a reciprocating, rotary type wheel operatively disposed in front of said platen; power-driven means for reciprocating said wheel to strike said platen or paper supply mounted thereon; and means for lifting said wheel in service relation to said platen, said wheel being normally removed from the plane of vision of the printing executed thereby when on said platen.

8. A machine as characterized, comprising a wheel having a series of duplicate groups of printing members; a locating table having disposed thereon a series of interference members, said interference members equaling in number said printing members; manually operative means disposed in groups to correspond with the groups of printing members on said wheel, said interference members being operatively disposed to arrest said wheel in printing position; means automatic in operation, for successively engaging said interference members, whereby a group of simultaneously-arranged arresting members successively position said printing wheel in accordance with the precessive arrangement of the characters thereon; and means for holding said interference members in operative relation until said wheel has made a complete revolution.

9. A machine as characterized, comprising a wheel having a series of duplicate groups of printing members; a locating table having disposed thereon a series of interference members, said interference members equaling in number said printing members; manually operative means disposed in groups to correspond with the groups of printing members on said wheel, said interference members being operatively disposed to arrest said wheel in printing position; means automatic in operation, for successively engaging said interference members, whereby a group of simultaneously-arranged arresting members successively position said printing wheel in accordance with the precessive arrangement of the characters thereon; means for holding said interference members in operative position; and means operable by said locating table for releasing said means for holding said interference members.

In testimony whereof I have signed my name to this specification in the presence of two subscribing witnesses.

PEDRO ROBLE.

Witnesses:
E. MURDOCK,
PHILIP D. ROLLHAUS.